US012315288B1

(12) United States Patent
Smith et al.

(10) Patent No.: US 12,315,288 B1
(45) Date of Patent: May 27, 2025

(54) AUTOMATED USER-IDENTIFICATION SYSTEMS

(71) Applicant: Amazon Technologies, Inc., Seattle, WA (US)

(72) Inventors: Matthew Christopher Smith, Seattle, WA (US); Baomin Wang, Seattle, WA (US); Howie Ho Wai Lau, Seattle, WA (US); Jennifer Li, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 141 days.

(21) Appl. No.: 17/854,880

(22) Filed: Jun. 30, 2022

(51) Int. Cl.
*G06K 9/00* (2022.01)
*G06K 9/20* (2006.01)
*G06T 7/70* (2017.01)
*G06V 40/12* (2022.01)
*H04N 5/33* (2023.01)
*H04N 7/18* (2006.01)
*H04N 23/56* (2023.01)
*H04N 23/74* (2023.01)

(52) U.S. Cl.
CPC ............ *G06V 40/1347* (2022.01); *G06T 7/70* (2017.01); *H04N 7/183* (2013.01); *H04N 23/56* (2023.01); *H04N 23/74* (2023.01); *G06T 2207/10024* (2013.01); *G06T 2207/10048* (2013.01); *G06T 2207/30196* (2013.01)

(58) Field of Classification Search
CPC ............. G06V 40/1347; G06T 7/70; G06T 2207/10024; G06T 2207/10048; G06T 2207/30196; H04N 23/74; H04N 23/56; H04N 7/183; G06F 21/32
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 11,734,949 B1* | 8/2023 | Kviatkovsky | G06V 40/1365 382/181 |
| 2011/0080490 A1* | 4/2011 | Clarkson | G06F 3/0428 348/370 |
| 2012/0194662 A1* | 8/2012 | Zhang | G06V 10/143 348/E7.085 |
| 2012/0283709 A1* | 11/2012 | Reichert | A61N 5/0616 606/9 |
| 2013/0284806 A1 | 10/2013 | Margalit | |
| 2016/0343187 A1* | 11/2016 | Trani | H04W 4/021 |
| 2017/0325721 A1* | 11/2017 | Matsuda | A61B 5/0059 |

(Continued)

*Primary Examiner* — Yong Hang Jiang
(74) *Attorney, Agent, or Firm* — Lindauer Law, PLLC

(57) ABSTRACT

This disclosure describes techniques for identifying users that are enrolled for use of a user-recognition system and updating identification data of these users over time. The user-recognition system may include a user-recognition device having projector(s) and/or camera(s) aimed substantially downwards. The device may include a projector that projects a visible light ring downwards, which the user may use to place their upward-facing palm in the appropriate location. For instance, the user may place their palm face-up with the light ring substantially centered thereon, after which a camera of the user-recognition device may generate image data of the palm, which in turn may be used to identify the user.

20 Claims, 14 Drawing Sheets

(56) References Cited

U.S. PATENT DOCUMENTS

| | | | | |
|---|---|---|---|---|
| 2018/0214588 A1* | 8/2018 | Casares | ................... | A61L 2/202 |
| 2020/0302147 A1* | 9/2020 | Gabriele | .............. | G06V 10/145 |
| 2020/0311404 A1* | 10/2020 | Derakhshani | ...... | G06V 40/1382 |
| 2022/0300593 A1* | 9/2022 | Brownlee | .......... | G06V 40/1353 |

* cited by examiner

AUTOMATED USER-IDENTIFICATION SYSTEMS

BACKGROUND

The use of computing devices continues to proliferate. As usage proliferates, so too does the manner in which these computing devices identify and/or authenticate users. For instance, users often authenticate with a computing device by typing in a username/password combination, providing biometric data (e.g., fingerprint scan, etc.), answering one or more questions known the user, or the like. In some instances, easing the user-identification and authentication process enhances the experience of the user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
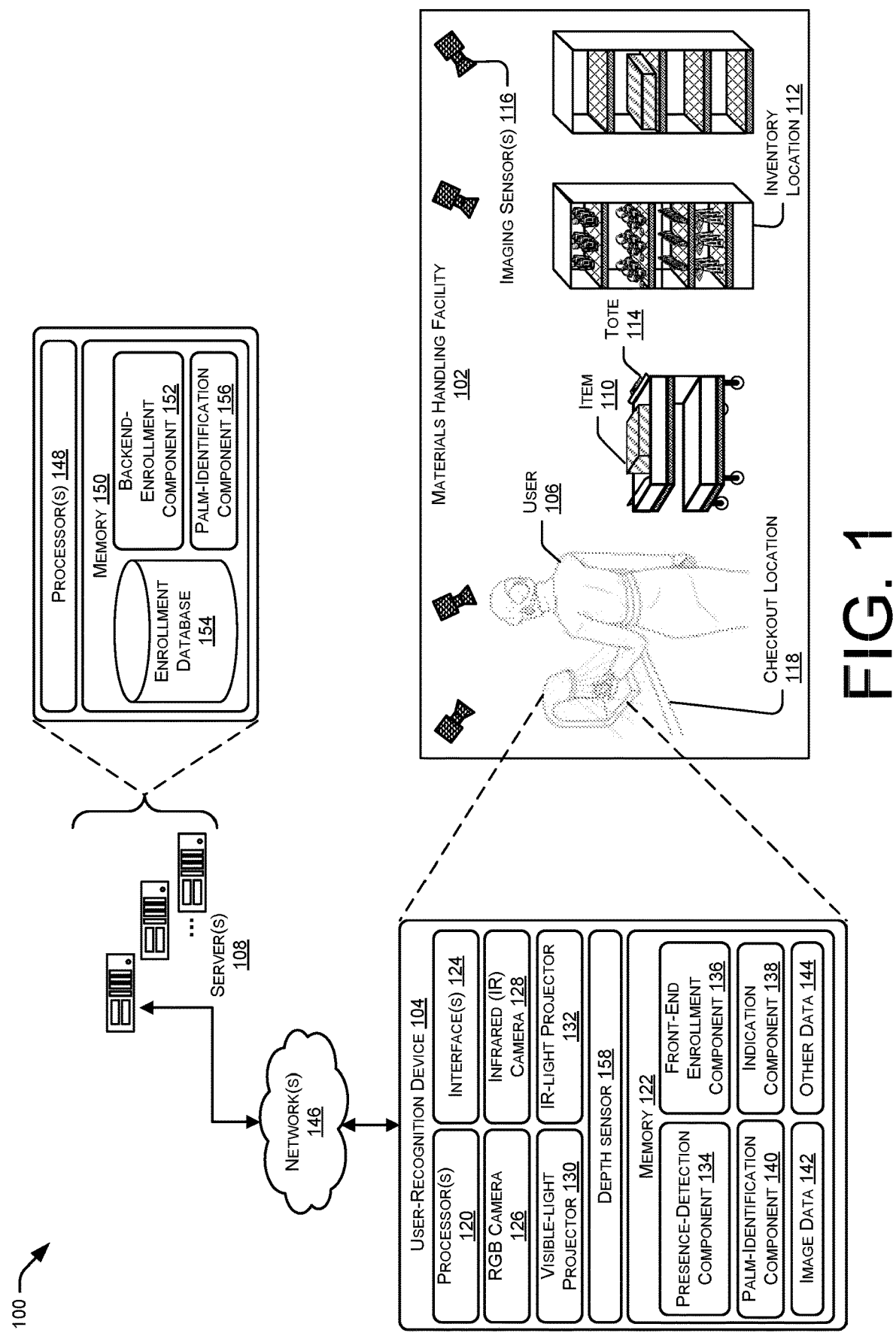
FIG. 1 illustrates an example environment that includes a user-recognition device in communication with one or more servers, which collectively form a user-recognition system in which a user may enroll in the system and later be identified via the system. In this example, the user-recognition device generates image data corresponding to a palm of the user and sends the image data to one or more servers to enroll the user in the user-recognition system. Thereafter, the user may be identified and/or authenticated at the user-recognition device or another user-recognition device via his or her palm.

This disclosure describes systems and techniques for identifying users using biometric-recognition techniques. As described below, users may enroll with a user-recognition system that utilizes various biometric-based recognition techniques so users may be identified without having to carry or use traditional forms of identification, such as showing an ID card or accessing their personal phone. The user-recognition system may recognize, or identify, enrolled users for various purposes, such as for automating traditional checkout experiences in a materials handling facility (or "facility") by charging appropriate user accounts with purchases of items selected by enrolled users in the facility.

In one illustrative example, the systems and techniques are used to recognize or identify users within a facility, which may include, or have access to, an inventory-management system. The inventory-management system may be configured to maintain information about items, users, condition of the facility, and so forth. For example, the inventory-management system may maintain data indicative of a result of different events that occur within the facility, such as what items a particular user picks or returns, a location of the particular user, and so forth.

Operation of the inventory-management system may be supported by sensor data acquired by one or more sensors. The sensor data may include image data acquired by imaging devices such as cameras, information acquired from radio frequency tags, weight sensors, and so forth. For example, the inventory-management system may automatically identify an item removed from an inventory location as well as a user that removed the item. In response, the inventory-management system may automatically update a virtual shopping cart of the user.

Traditionally, when a user has finished their shopping session, the user would have to pay for their items by having a cashier scan their items, or by using dedicated self-checkout stands. The techniques described herein reduce friction in the traditional checkout experience by recognizing or identifying a user enrolled for use of the user-recognition system and charging a user account for that user with the cost of the items included in their virtual shopping cart. According to the techniques described herein, a user enrolled with the user-recognition system may need only provide biometric information by, for example, scanning a palm of the user at an imaging device, scanning a fingerprint of the user, looking at a camera of a user-recognition device located in the facility, speaking a predefined utterance to the device, or the like in order to be identified by the user-recognition system.

To utilize the user-recognition system, a user may request to be enrolled by interacting with a user-recognition device positioned in a facility. For example, the user may select an enroll option on a display of the user-recognition device, issue a voice or GUI-based command requesting to be enrolled, insert a user ID card into the user-recognition device, and/or simply present their hand or palm before the user-recognition device to prompt the enrollment process.

Upon requesting to be enrolled in the user-recognition system, the user-recognition device may, with permission and/or upon explicit request by the user, begin collecting various types of biometric data, and/or other data, for the user. For example, the user-recognition device may include one or more imaging sensors (e.g., a camera) that begins capturing image data (e.g., an individual image, a sequence of images, a video, etc.) of at least a portion of the user, such as a palm of the user, a face of the user, or the like. In the example of the palm, the user-recognition device may request that the user move their hand to different angles and/or orientations as the device captures the image data and may also capture image data under different lighting conditions (e.g., no flash, flash, different light polarizations, etc.), to generate image data representing the palm of the user under different environmental conditions.

In some examples, the user may already have an account registered with the inventory-management system to pay for items selected during a shopping session. In such examples, the user-recognition device may determine a user account with which the user is registered in various ways, such as by requesting that the user insert a personal ID card (e.g., driver's license), scan a barcode that may be presented on a display of a phone of the user, login with his or her login credentials, and so forth. Alternatively, the user may sign up for an account with the inventory-management system, and create a corresponding user profile, at the time of enrollment.

Once the user-recognition device has obtained the image data representing the palm or other potion of the user, the user-recognition device may utilize this data to enroll the user with the user-recognition system. In some examples, the user-recognition system may be implemented entirely on the user-recognition device, which may include the software, firmware, and/or hardware components to implement the techniques described herein. However, in some examples, the user-recognition system may be implemented according to a split architecture where the user-recognition device performs client-side enrollment and identification techniques, and more intensive and/or advanced processing may be performed using a backend, server-based implementation. For example, the user-recognition system may include one or more network-based computing devices positioned at a separate location in the facility, and/or at a remote, cloud-based location. The network-based devices may include various components for implementing the user-recognition system.

In such examples, the user-recognition device may send the image data, and/or feature data generated by the user recognition device using the image data, to the network-based devices to enroll the user for the user-recognition system. The network-based devices of the user-recognition system may perform various processing techniques on the image data and/or feature data such that the user-recognition system is able to identify the user from subsequently received image data and/or feature data.

The user-recognition system may analyze the image data to determine various features of the user. For example, the user-recognition system may extract and/or generate, based on the image data, palm-feature data representing the palm of the user. This palm-feature data may represent biometric characteristics or information that is potentially unique to the palm of the user, such as the pattern of creases in the user's palm, the pattern of veins of the user's palm, the geometry of one or more portions of the user's hand (e.g., finger sizes/shape, palm size/shape, etc.), and/or the like. The user-recognition system may utilize any type of processing techniques to generate the palm-feature data and may represent the palm of the user depicted in the image data using various types of data structures, such as feature vectors. In some examples, the user-recognition system may include one or more trained models (e.g., machine-learning models) that have been trained to receive image data of a user as input, and output feature vectors representing a palm of the user. Generally, the trained model(s) may comprise any type of models, such as machine-learning models (e.g., artificial neural networks, convolution neural networks (CNNs), classifiers, random-forest models, etc.) that may be trained to identify a palm of a user and/or one or more other portions of the user (e.g., face, etc.).

Upon obtaining the feature data that represents the palm of the user, the user-recognition system may store the feature data in an enrollment database and associate the feature data with a user profile for that specific user. In this way, when subsequent image data is received for a user at a user-recognition device, the feature data stored in the enrollment database may be compared with the feature data generated from the subsequent image data to identify a user profile for the user represented in the subsequent image data and/or audio data. As such, the feature data stored in the enrollment database may be deemed "identification data", in that it is used to compare against subsequent feature data generated based on image data (or audio data) generated at a time when the user is requesting identification and/or authentication.

In this way, the user may be enrolled for use of the user-recognition system such that, after completing subsequent shopping sessions, the user may checkout by placing his or her palm over an imaging component of a user-recognition device to allow the user-recognition system to automatically recognize the user. The user-recognition device may detect the presence of the user (e.g., detect the palm, detect a face, detect the speech utterance, detect a touch input via a touch display, etc.), and begin streaming image data and/or audio data to the backend devices of the user-recognition system. The backend devices of the user-recognition system may then utilize the trained model(s) to extract feature data and compare that feature data to stored feature data ("identification data") for user profiles of enrolled users. In addition, or in the alternative, the user may scan his or her palm for recognition upon entering the facility and, in some instances, may simply exit the facility with his or her picked items and without again scanning his or her palm. In these instances, the user may be identified upon entry and located by the system as the user moves about the facility, such that the user may "just walk out" without further interaction with associates or devices at the facility.

In some instances, the user-recognition device may oriented downwards such that a user enrolling in the system or requesting to be identified by the system may extend their hand in a palm-up manner for reading by the device. In some instances, the user-recognition device may include one or cameras having respective field-of-view (FOVs) that are directed substantially downwards, as well as one or more light projectors also having FOVs that are directed substantially downwards. For instance, the user-recognition device may include a projector that is configured to project visible light substantially downwards, with this visible light functioning to inform the user as to where to place their hand to be read by the device. For instance, the visible-light projector may project, via a laser or otherwise, a visible-light ring that is presented on a surface underneath the device, potentially along with instructions informing the user to place their palm upwards such that the visible light ring is substantially centered on their palm. For instance, the surface on which the visible light ring is projected (e.g., a floor, a tabletop, etc.) may include a sticker or other printed instructions that inform the user to place their hand underneath the light right. In other instances, the device may audibly output the instructions. Further, while this example describes using a light ring to direct the user where to place their palm, this visible-light projector may project any type of shape or pattern.

In some instances, the user-recognition device may include one or more cameras, such as a red-green-blue (RGB) camera, an infrared (IR) camera, and/or the like. In some instances, the RGB camera may be used to determine when a user palm (or other body part) is underneath the user-recognition device for initiating one or more components for performing an identification and/or authentication process, as described below. In other instances, the user-recognition device may include a depth sensor (e.g., a time-of-flight (ToF) sensor) or other type of sensor (e.g., motion sensor, IR sensor, etc.) for determining when a palm of a user is underneath or within the FOV of the device. In addition, or in the alternative, the RGB camera, the depth sensor, or the other type of sensor may function to determine whether the user palm is within a "Z" range of the device within the which the user-recognition device is capable of generating accurate image data for recognizing the user. That is, as discussed below, the user-recognition device may have a working range of distances in which the device accurately generates image data to recognize a user. The RGB camera or depth sensor may thus be used to sense a depth of the user palm to determine if the user palm is within the working distance, too low, or too high. For instance, the RGB camera may determine a depth of the user palm by recognizing a size or other feature(s) of the light ring projected onto the user palm. In some instances, the user-recognition device may be configured to output an indication of whether the user palm is too low: too high, or within the working distance. For instance, the user-recognition device may be configured to project a first color when the user palm is within the working distance of the user-recognition device (e.g., green), a second color when the user palm is too low (e.g., blue), and a third color when the user palm is too high (e.g., red). Of course, while a few examples are given, it is to be appreciated that the device may project different patterns, colors, shapes or the like for informing the user whether the user palm is within or outside of the working distance of the device.

In addition, or in the alternative, the RGB camera, depth sensor, or other type of sensor may also be used to determine whether the user palm is located within an appropriate X-Y range of the FOV(s) of component(s) of the device for performing the user-recognition process. For instance, the RGB camera may generate image data of the user palm, which may be analyzed to determine whether the visible light ring (or other visible light shape/pattern) is substantially centered on the user palm. Again, the device may output indications regarding whether the user palm is located correctly or incorrectly. For instance, the visible light projector may project different colors, shapes, patterns, or the like to indicate if the user palm is located correctly or to indicate to the user how to move their palm so that it becomes located appropriately. Again, these indications may presented visually, audibly, or in any other manner. Further, while this example describes using image data generated by the RGB camera to determine whether the user palm is located correctly, it is to be appreciated that in other instances the user-recognition device may utilize any other type of depth sensor (e.g., time-of-flight (ToF) sensor) for making these determinations.

In addition to the above, the user-recognition device may include an IR projector to project IR light and an IR camera configured to generate image data indicative of the IR light. In some instances, the IR projector and/or the IR camera may initiate some or all of their operations in response to the RGB camera, depth sensor, or other sensor detecting a palm of a user or other user body part within an FOV of the device. For instance, the IR projector and/or the IR camera may be awakened in response to the depth sensor detecting something in its path (e.g., within the FOV of the camera(s) or projector(s)). Further, in some instances, the light ring or other visible light may be projected in response to the RGB camera, depth sensor, or other sensor detecting a palm or other object in an FOV of the camera(s) or projector(s). In other instances, the visible-light projector may project the light ring or visible light when the device itself is on or in response to detecting a user approaching the user-recognition device but prior to the user placing his or her palm within the FOV of the camera(s) or projector(s).

The IR projector may project IR light, which may strike the user palm when the user palm is within the FOV of the IR projector. The IR camera may then generate image data of the user palm as the IR light strikes the palm. The user-recognition device may then send this image data generated by the IR camera (and, potentially, the image data generated by the RGB camera and/or other camera(s)) to the network-based devices for enrolling the user in the user-recognition system or to identify an already enrolled user.

Thus, the user-recognition device may project a visible light ring or other shape to instruct the user regarding where to place their upward-facing palm. Thereafter, image data of the properly placed, upward-facing palm may be generated, with this image data potentially including IR light projected on the palm. The device may then either send the image data (or feature data generated therefore) to a network-based device for enrolling and/or identifying, and/or may perform an enrollment and/or identification process locally. The user-recognition device thus provides an intuitive process for a user to properly place their palm in a manner that is likely to generate high-quality image data of their palm, which leads to a high-accuracy user-recognition system.

Further, it is noted that the user-recognition devices described herein may take any type of form factor. For instance, a user-recognition device may sit atop a table, affix to a horizontal or vertical surface, comprise a mobile, handheld scanner, or the like. In these instances, the user-recognition device may include a trigger or other component for actuation by a user to cause the visible-light projector to project the visible light ring, to cause the IR projector to project the IR light, and to cause the RGB camera and the IR camera to generate the first and second image data, respectively.

Although the techniques described herein are primarily with reference to identifying users for the purpose of identifying a user account to charge for items selected from a materials handling facility, the techniques are equally applicable to any industry in which user recognition may be helpful. For instance, the user-recognition system may be implemented for security purposes such as accessing locked locations, accessing user accounts via computing devices, accessing bank accounts, and so forth. Further, while certain types of machine-learning models and algorithms are discussed herein, the techniques may be employed using other types of technologies and are generally scalable to different computer-based implementations. Further, while the techniques are described with reference to identifying users via feature data generated from user palms, it is to be appreciated that the techniques may apply to any other type of biometric data that may uniquely identify users.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations. For instance, the described techniques for utilizing biometric data for identifying users upon their explicit request may be utilized in an array of environments for an array of purposes. For instance, these techniques may be utilized for identifying users upon entry to an environment (e.g., upon entry to a secure area of an environment), identifying users requesting to utilize equipment or other physical apparatuses, identifying users at kiosks or other locations, and/or any other type of environment where users may request to be identified and/or authenticated.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 of a materials handling facility 102 that includes a user-recognition device 104 to determine that a user 106 would like to enroll for use of a user-recognition system or that the user 106 who has previously enrolled would like to be identified and/or authenticated with the user-recognition system. In this example, the user-recognition device 104 generates image data depicting a palm of a user 106 and sends the image data to one or more backend servers 108 to be used to enroll the user for use of the user-recognition system or to identify the user 106. Generally, the user-recognition system may include the user-recognition device 104 and/or the server(s) 108.

In some instances, some or all of the user-recognition system resides remotely from the materials handling facility 102, while in other instances some or all of the user-recognition system resides within or proximate to the materials handling facility 102. As FIG. 1 depicts, the user 106 may have engaged in, or be about to engage in, a shopping session in the materials handling facility 102. For instance, the user 106 may have selected an item 110 from an inventory location 112 (e.g., shelf, aisle, etc.) and placed the item 110 in a tote 114 (e.g., shopping cart). The inventory location 112 may house one or more different types of items 110 and the user 106 may pick (i.e., take) one of these items 110.

As illustrated, the materials handling facility 102 (or "facility") may include one or more sensors, such as the illustrated imaging sensors 116, and/or an array of other sensors located on or near the inventory location(s) 112. In this example, the imaging sensor(s) 116 are configured to capture video data within the facility 102 for use in determining results associated with events, such as the picking of the item 110 by the user 106. While FIG. 1 illustrates various example sensors, the sensors in the facility 102 may comprise any other type of sensor, such as weight sensors (e.g., load cells), microphones, and/or the like, as described in detail below: As described in more detail with respect to FIGS. 11 and 12, the facility 102 may be monitored and/or otherwise associated with an inventory-management system configured to determine events in the facility 102 associated with the user 106, such as taking items 110 that the user 106 would like to purchase. The inventory-management system may track the items 110 selected by the user 106 and maintain a virtual shopping cart which includes all of the items 110 taken by the user 106. Thus, when a user 106 would like to leave the facility 102 with the items 110 they have taken, the inventory-management system may charge a user account associated with the user 106 for the cost of the items 110 that were taken.

As shown in FIG. 1, the user 106 may approach a checkout location 118 associated with the user-recognition device 104. The user 106 may determine that they would like to enroll for use of a user-recognition system in order to checkout of the facility 102 and pay for their item(s) 110. Alternatively, or additionally, the user may interact with the user-recognition device 104 upon entering the facility 102. In either instance, the user 106 may determine that they would like the user-recognition system to collect data that is usable to identify an account or profile of the user 106. This data may be utilized by the user-recognition system such that, once enrolled, the user 106 need only scan his or her palm to be identified by the user-recognition system in order to charge their user account with the purchase of their item(s) 110.

As illustrated, the user-recognition device 104 may comprise one or more processors 120 configured to power components of the device 104 and may further include memory 122 which stores components that are at least partially executable by the processor(s) 120, as well as other data. For example, the memory 122 may include a presence-detection component 134 to detect the presence of a user 106 and a front-end enrollment component 136 configured to perform various operations for enrolling the user 106 for use of the user-recognition system. The front-end enrollment component 136 may receive a request to enroll the user 106 for use of the user-recognition system. The request may comprise various types of input, such as a selection made via an I/O interface 124 (e.g., touch screen, mouse, keyboard, etc.) of a user interface element presented on a display for starting an enrollment process. Additionally, the front-end enrollment component 136 may detect a speech utterance from the user 106 indicating a request to enroll (e.g., "please enroll me." "I would like to check out," etc.). Another request example may include the user 106 sliding a user ID card into an I/O interface 124, such as a credit card, driver's license, etc. However, any type of input may be detected as a request by the front-end enrollment component 136.

In some examples, the presence-detection component 134 may be executable by the processor(s) 120 to detect a trigger indicating presence of the user 106. The trigger detected by the presence-detection component 134 may comprise one or more types of input. For instance, the presence-detection component 134 may include logic to detect, using an RGB camera 126, an IR camera 128, or a depth sensor 158 (e.g., a ToF sensor, an RGB camera operating as a depth sensor, etc.), a palm of the user 106 over or proximate to the user-recognition device 104. Other examples of triggers detected by the presence-detection component 134 that may indicate the presence of the user 106 may include receiving touch input (or other input, such as a mouse click) via one or more I/O interfaces 124 of the user-recognition device 104. However, any type of input may be detected as a trigger by the presence-detection component 134. Further, it is to be appreciated that in other instances, the device 104 may include a liveness-detection component configured to determine whether an object is a palm or an inanimate object.

After receiving the request to enroll from the user 106, the front-end enrollment component 136 may, begin generating image data 142 using one or more cameras, such as the camera 126 and/or the camera 128. For instance, the front-end enrollment component 136 may utilize the camera(s) to obtain image data 142 such as an image or picture, a sequence of consecutive images, and/or video data. The image data 142 may represent an upward-facing palm of the user 106 and may be used to identify creases in the palm, veins in the palm, geometric information regarding the palm and other parts of the hand or the user 106 and/or the like. In some instances, the device 104 further includes a visible-light projector 130 configured to project visible light (e.g. a ring) to provide an instruction to the user regarding where to place their palm and an IR projector 132 to project IR light for illuminating the upward-facing palm with IR light. Also as illustrated, the memory 122 may store an indication component 138 configured to output, to the user 106, an indication of whether the upward-facing palm of the user is appropriately positioned in the Z dimension (depth), as well as in the X-Y plane. For instance, the indication component may cause the visible-light projector to project visible light in different colors, patterns, shapes, or the like to indicate whether the user palm is appropriately positioned or whether the user is to move their palm, up, down, left, and/or right (and/or at a different angle).

Once the upward-facing palm is detected and appropriately positioned, the front-end enrollment component 136 has obtained the image data 142 representing the palm or other portion of the user 106, the user-recognition device 104 may send (e.g., upload, stream, etc.) the image data 142 to the servers 108 over one or more networks 146 using one or more communication interfaces. In other instances, meanwhile, the user-recognition device 104 may include a palm-identification component 140 to perform identification processes locally.

In some instances, the depth sensor 158 may be configured to detect an object within an FOV of the camera(s) of the user-recognition device 104 and, in response, may cause the IR-light projector 132 to begin projecting IR and the IR camera 128 to begin generating image data 142. In these instances, the visible-light projector 130 may have previously been instructed to project the visible light ring, while in other instances the visible-light projector 130 may also be instructed to project the visible light ring in response to the depth sensor detecting the object or in response to another sensor detecting a user approaching the device 104. In either instance, the image data 142 generated by the IR camera 128 may be sent to the servers 108 for performing an identification and/or authentication process. In these instances, the RGB camera 126 may be used to perform one or more functions separate from the palm-recognition processes, such as reading a barcode or other visual indicia on a phone or other device of the user 106 (e.g., to identify an account of the user), reading a barcode or other visual indicia of a coupon or item for updating a virtual shopping cart of the user 106, and/or the like. In some instances, the RGB camera 126 may be configured to perform autofocus techniques in order to autofocus onto a palm of the user or another object prior to generating image data of the palm or other object.

The network(s) 146 may include private networks such as an institutional or personal intranet, public networks such as the Internet, or a combination thereof. The network(s) 146 may utilize wired technologies (e.g., wires, fiber optic cable, and so forth), wireless technologies (e.g., radio frequency, infrared, acoustic, optical, and so forth), or other connection technologies. The network(s) 146 is representative of any type of communication network, including one or more of data networks or voice networks. The network(s) 146 may be implemented using wired infrastructure (e.g., copper cable, fiber optic cable, and so forth), a wireless infrastructure (e.g., cellular, microwave, satellite, etc.), or other connection technologies.

The communication interface(s) of the user-recognition device 104 may include devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the image data 142 and/or other data 144 generated by the user-recognition device 104 prior to sending over the network(s) 146 according to the type of protocol or standard being used.

As illustrated, the servers 108 may comprise one or more processors 148 and memory 150, which may store a back-end-enrollment component 152, a palm-identification component 156, and an enrollment database 154. While certain functionality of these components are introduced here, further detail regarding these components is described with reference to FIG. 8.

Upon receiving the image data 142 from the user-recognition device 104, one or more components of the back-end servers 108, such as the backend-enrollment component 152 or the palm-identification component 156, may generate feature data using the image data. This feature data may be in a vector form and may represent characteristics about the user's palm that may be used to differentiate the palm from other user palms. It is to be appreciated that while the servers 108 are described as generating the feature data, in other instances the user-recognition device 104 may be configured to generate the feature data and may send the feature data, in addition to or rather than the image data 142, to the servers.

One or more components of the servers 108, such as the backend-enrollment component 152 or the palm-identification component 156, may store the feature data as identification data in the enrollment database 154 in association with a user profile of the user 106. That is, this palm-feature data (or "identification data") is stored such that it may be compared to feature data generated from subsequent image data for later identification of the user 106 at the facility 102 or other facilities that are associated with the user-recognition system.

Figure 2A:
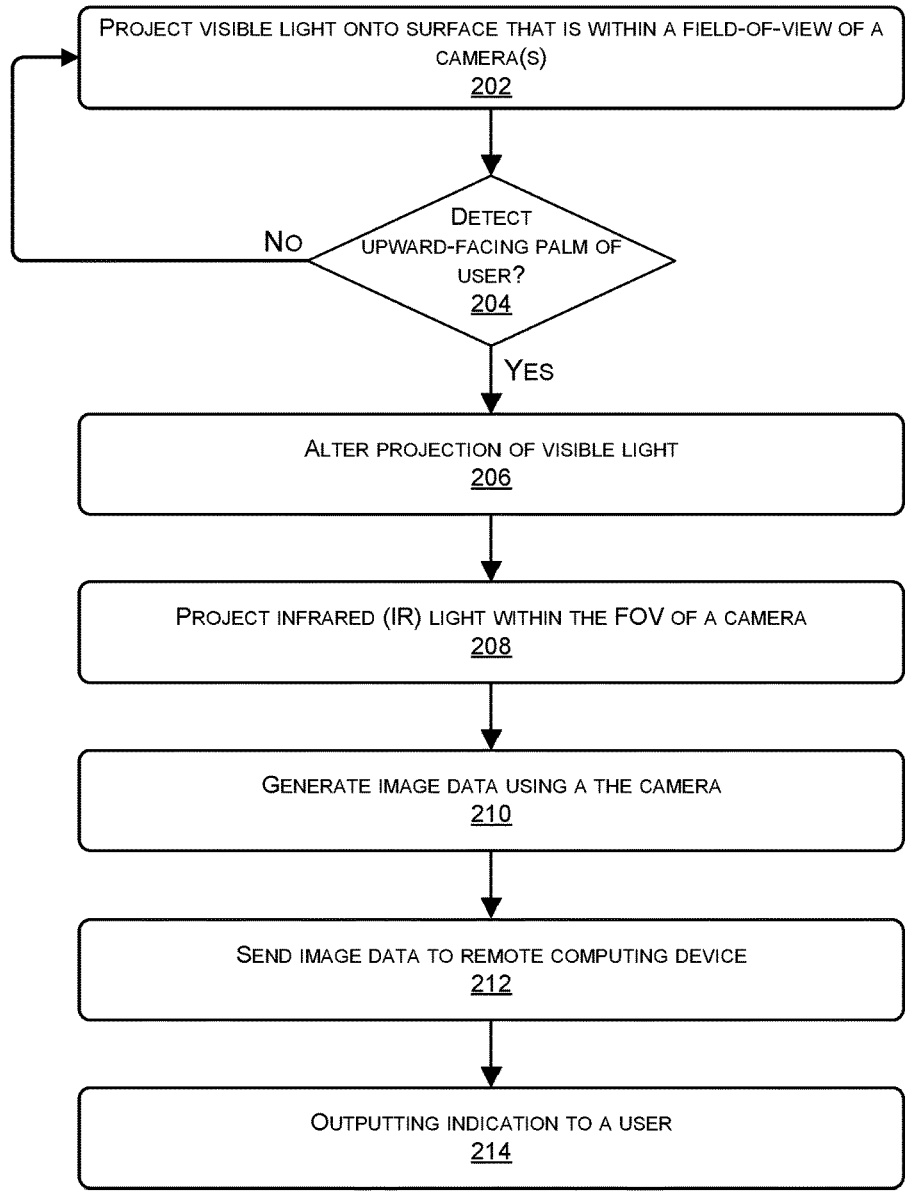
FIGS. 2A-B each illustrate a respective example process that the user-recognition device of FIG. 1 may implement identifying a user via his or her palm after the user has enrolled with the user-recognition system.

After the user has enrolled in the user-recognition system, the imaging components 126 may receive additional image data of the palm of the user 106 and/or of palms of users of the system, such as at a time when the user 106 or other users return to the facility 102 at a later date. After the servers 108 receive the additional image data from the user-recognition device 104, the palm-identification component 156 or other components(s) of the servers 108 may generate additional feature data based on the additional image data. At this point, one or more components of the servers 108, such as the palm-identification component 156, may compare the additional feature data to feature data stored in respective user profiles for the purpose of identifying the user associated with the additional image data. For example, the user-recognition system may compare the additional feature data generated with the identification data stored in association with the user profile of the user 106 to determine that the additional image data corresponds to the user 106. In response to determining that the additional image data corresponds to the user profile associated with the user 106, the servers 108 may store this indication and output a notification that the user has been recognized. For instance, the servers 108 may cause the user-recognition device 104 to output a visual and/or audible indication regarding the successful recognition and/or may perform additional actions, such as charge a payment instrument associated with the user profile for any items acquired from the facility 102. In addition, the servers 108 may store the additional feature data in association with the profile of the user 106 in the enrollment database 154. This additional feature data may be used to update the identification data associated with the user 106, as described below:

FIG. 2A illustrates an example process 200 that the user-recognition device of 104 may implement identifying a user via his or her palm after the user has enrolled with the user-recognition system. The process 200, as well as the additional processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, the processes described herein may be performed, in whole or in part, by the servers 108, the user-recognition device 104, and/or a combination thereof.

At an operation 202, the visible-light projector 130 of the user-recognition device may projector visible light onto a surface that is within respective fields-of-view (FOVs) of one or more cameras of the user-recognition device. For instance, the visible-light projector 130 may project the visible light substantially downwards onto the surface. In some instances, the visible light comprise a light ring or other shape that is to be used by the user for positioning on their upward-facing palm. For instance, the surface or the projected light may include instructions telling the user to position their palm such that the light ring or other shape is substantially centered on the palm of the user.

An operation 204 represents determining whether the user-recognition device 104 has detected an upward-facing palm of a user. For instance, this operation may comprise determining whether an indication has been received from the depth sensor 158 indicating that an object is underneath and within the FOV of the camera(s) of the device 104. The depth sensor may comprise a ToF sensor, an RGB camera, or any other type of sensor. If no palm is detected, then the process 200 returns to the operation 202. However, and as mentioned above, while FIG. 2A illustrates the visible-light projector projecting the visible light prior to detecting a palm, in some instances the user-recognition may cause the visible-light projector 130 to project the visible light in response to detect the palm or in response to detecting a user approaching or otherwise coming within proximity of the device 104 (e.g., via a motion sensor, camera, or the like).

If a palm is detected at the operation 204, then at an operation 206 the user-recognition device 104 may, in some instances, alter projection of the visible light and/or may indicate to the user in any other manner (e.g., audibly) that the user-recognition device has detected the palm and is going to generate image data of the palm for recognition purposes. For instance, the visible-light projector may cause the visible light to flash or strobe, may change the color of the projection, or the like. Thus, the visible light (e.g., light ring) may be used to help the user center his or her palm in the FOV of the camera(s) and, in addition, its presentation may be altered to indicate to the user that the image-capture process has begun or will take place shortly.

An operation 208 represents causing the IR-light projector to project the IR light within the field of view of a camera of the device 104, such as the IR camera 128. In some instances, this operation, as well as an operation 210, occurs in response to detecting the palm at the operation 204 in order to conserve battery power of the user-recognition device. Next, an operation 210 represents causing a camera of the device 104, such as the IR camera 128, to generate image data of the palm of the user while the IR light is being projected on the palm.

An operation 212 represents sending the image data to a remote computing device, such as the servers 108, for performing an identification and/or authentication process. Of course, while this figure illustrates sending this image data to the remote computing device, in some instances the user-recognition device may additionally or alternatively perform a local identification and/or authentication process based on the generated image data. Finally, an operation 214 represents outputting an indication to a user to indicate at least one of that the user-recognition device 104 has successfully generated the image data, that the user-recognition device 104 has successfully sent the image data to remote device, and/or that the user-recognition device 104 has received an indication that the remote computing device has successfully identified and/or authenticated the user based on the image data (or has failed to do so). This indication may comprise an audible indication output by a speaker of the device 104 or another device, a visual indication output by the device (e.g., altering projection of the visible light by the projector 130), a visual indication output by another device, and/or the like.

Figure 2B:
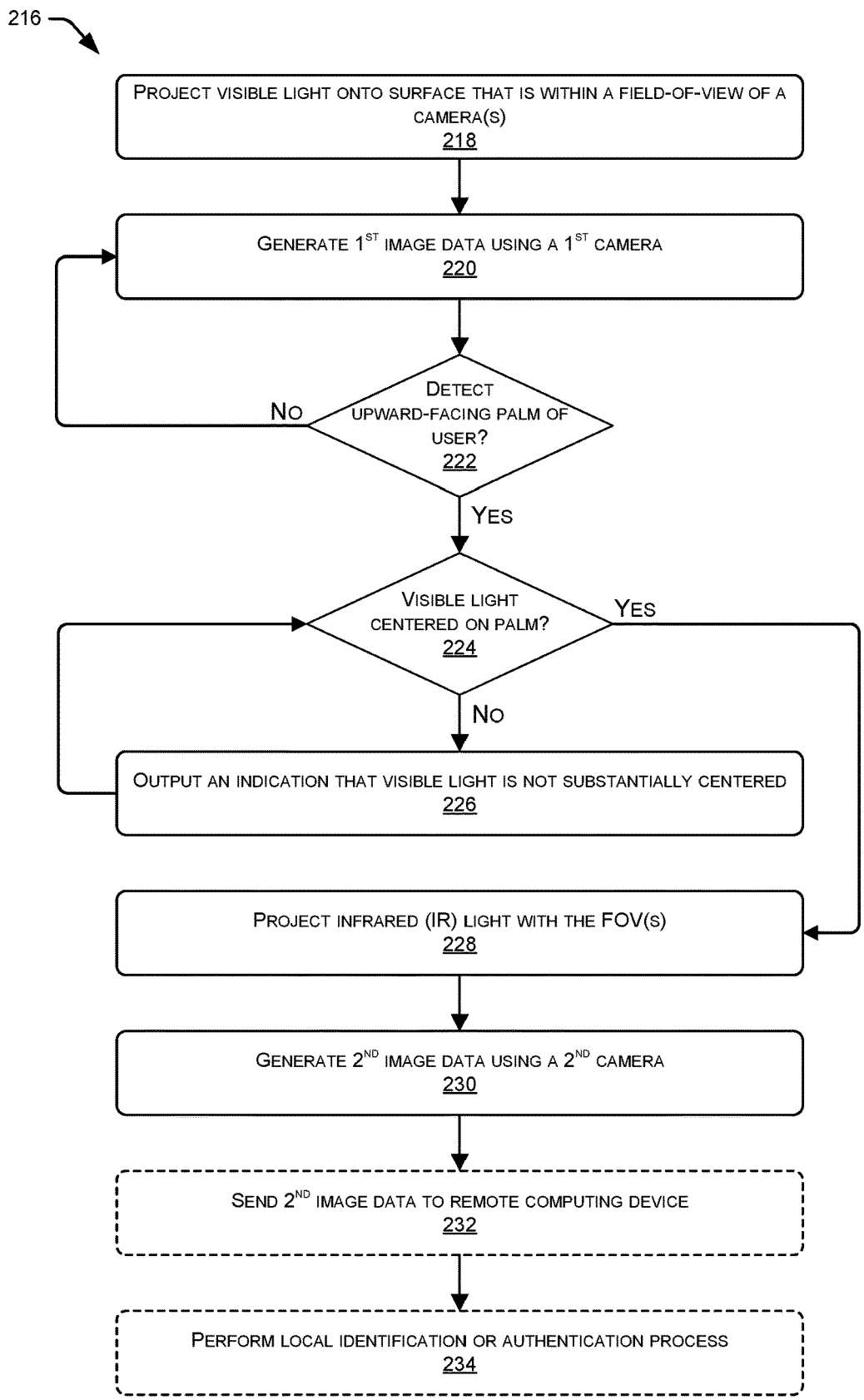

FIG. 2B illustrates another example process 200 that the user-recognition device of 104 may implement identifying a user via his or her palm after the user has enrolled with the user-recognition system. At an operation 218, the visible-light projector 130 of the user-recognition device may projector visible light onto a surface that is within respective fields-of-view (FOVs) of one or more cameras of the user-recognition device. For instance, the visible-light projector 130 may project the visible light substantially downwards onto the surface. In some instances, the visible light comprise a light ring or other shape that is to be used by the user for positioning on their upward-facing palm. For instance, the surface or the projected light may include instructions telling the user to position their palm such that the light ring or other shape is substantially centered on the palm of the user.

At an operation 220, represents the user-recognition device 104 generating first image data using a first camera of the device 104. For instance, this operation may comprise the RGB camera 126 of the device 104 generating first image data. At an operation 222, the user-recognition device 104 determines whether it detects an upward-facing palm of the user. For instance, the user-recognition device 104 may use computer-vision techniques to analyze the first image data to determine whether the first image data represents a palm of the user. In one example, the user-recognition device 104 uses a trained model to identify a palm.

If the device 104 does not detect a palm of the user, then the process 216 returns to the operation 220. If, however, the device 104 detects a palm, then at an operation 224 the device 104 may determine whether the visible light (e.g., the light ring) is substantially centered on the user palm. For instance, the device 104 may use computer-vision techniques, such as using a trained model, to determine whether the light ring is centered on the palm. This operation may also include analyzing the image data or other depth data to determine whether the user palm is within a working Z range of the device 104.

If the visible light (e.g., the light ring) is not centered on the user palm, then at an operation 226 the device 104 may an indication that the visible light is not substantially centered on the upward-facing palm of the user. This may include at least one of outputting an audible sound or changing a color or pattern of the visible light projected by the visible-light projector 130. The process 216 then returns to the operation 224 to determine whether the light is centered on the palm.

Upon determining that the visible light is centered on the palm, an operation 228 represents projecting IR light within the FOV(s) of the camera(s) of the device 104. For instance, this operation may comprise the IR-light projector 132 projecting the IR light substantially downwards onto the palm of the user. In some instances, the IR-light projector 132 may continually project the IR light, while in other instances the IR-light projector 132 may project the IR light upon device 104 (e.g., the presence-detection component 134) detecting a user palm. An operation 230 represents generating second image using the IR camera 128, with the second image data representing the upward-facing palm of the user while the infrared light is projected thereon.

An operation 232 represents that the user-recognition device 104 may send the second image data, or feature data generated therefrom, to a remote computing device, such as the servers 108. For instance, the device 104 may send this second image data to the servers 108 to enable the servers 108 to enroll the user into the user-recognition system or to attempt to identify a user account based on the second image data. In other instances, meanwhile, the user-recognition device 104 may perform a local identification and/or authentication process, as illustrated by an operation 234.

Figure 3A:
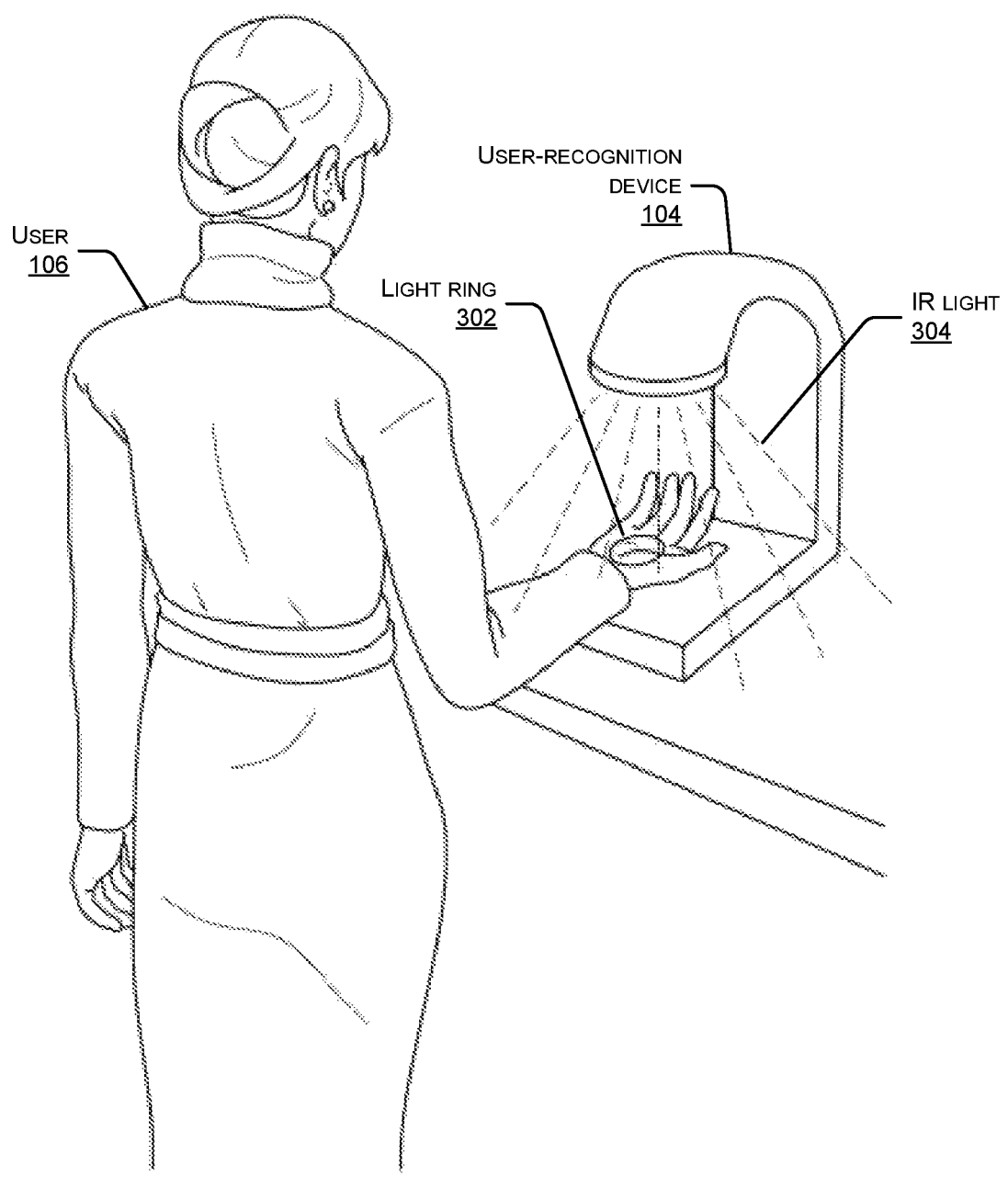
FIG. 3A illustrates the user-recognition device of FIG. 1 in greater detail.

FIG. 3A illustrates the user-recognition device 104 in greater detail. As illustrated, the user-recognition device 104 may have a tabletop form factor. The user 106 may walk up to the device 104 may place their palm face-up in order to be identified with the user-recognition system. As illustrated, the device 104 may project a visible light ring 302 to allow the user 106 to place their upward-facing palm in the appropriate location. FIG. 3 also illustrates that the user-recognition device 104 may also projector IR light 304 to help with the identification of the user 106.

Figure 3B:
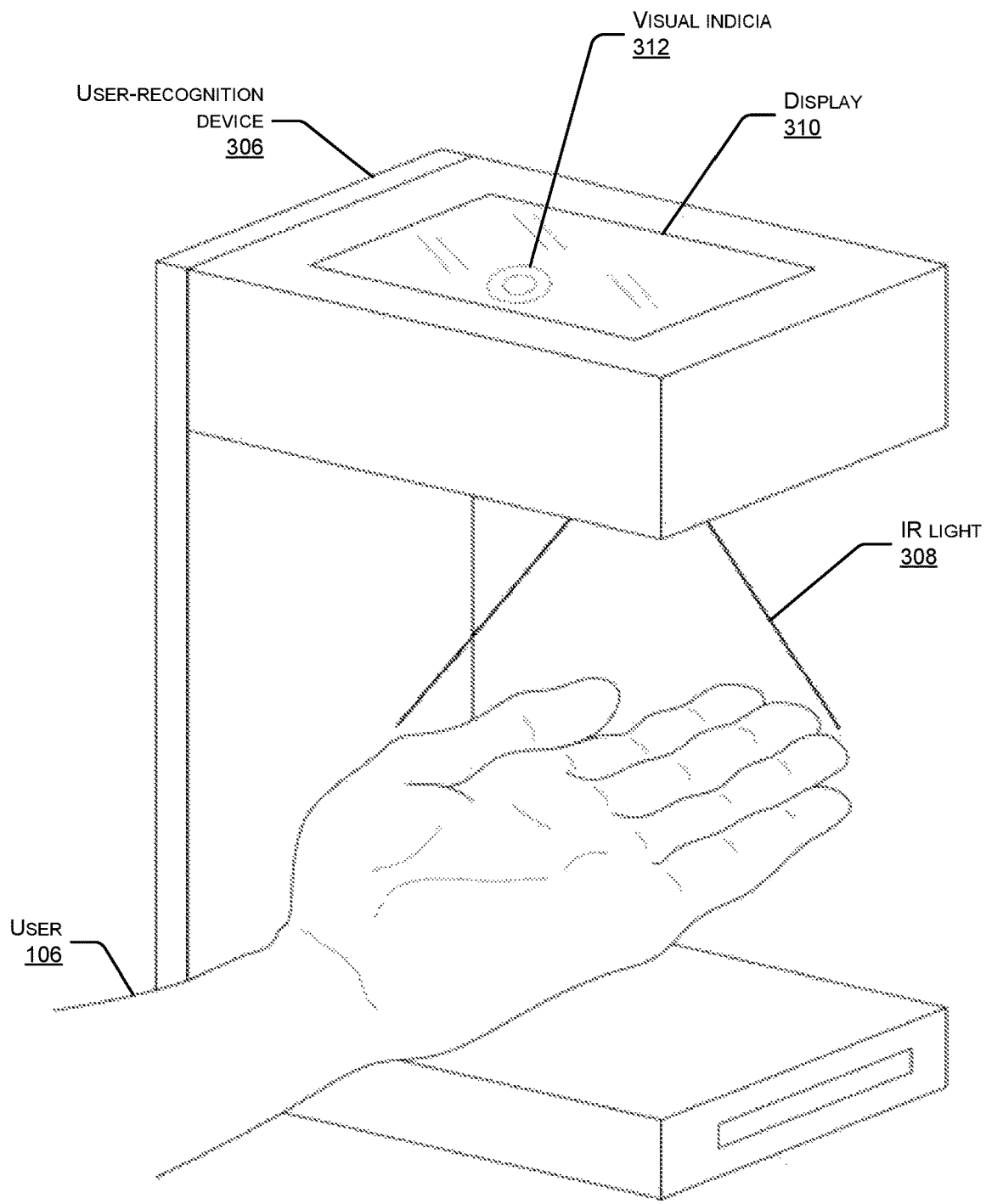
FIG. 3B illustrates another example user-recognition device in a tabletop form factor.

FIG. 3B illustrates another example user-recognition device 306 in a tabletop form factor. Again, the user 106 may insert her palm face-up within an FOV of a camera, such as the IR camera 128, while an IR-light projector 132 projects IR light 308 onto the palm. Again, the IRM camera 128 may then generate the image data of the palm of the user and send this image data to the servers 108 for performing an identification and/or authentication process.

In this instance, however, the user-recognition device 306 may include a display 310 to aid the user 106 in properly positioning her hand, in addition to or in lieu of the visible-light projector 130 projecting the visible light. For instance, the display 310 may be partially or entirely transparent to allow the user 106 to see her palm through the display 310. However, the display 310 may also include one or more visual indicia 312 instructing the user to align her palm in the appropriate location. In this example, for instance, the visual indicia 312 may comprise a displayed circle and the user 106 may be instructed to align the palm, as viewed through the display, with the circle, similar to how the user was instructed to centered the projected light ring onto her palm. In other instances, meanwhile, the visual indicia 312 may comprise a shadow of a hand and the user 106 may be instructed to align her palm with the shadow. Of course, while a few examples have been described, it is to be appreciated that any other type of visual indicia 312 may be used.

Figure 4:
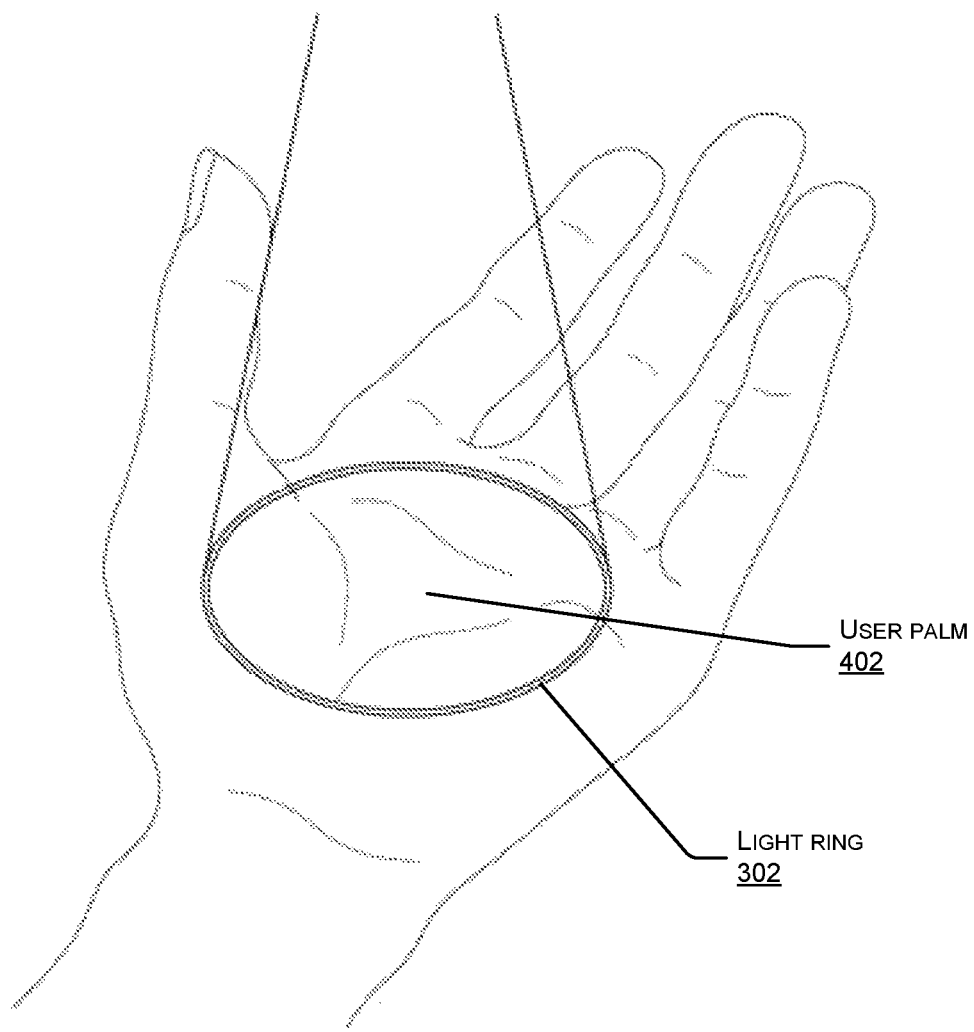
FIG. 4 illustrates a visible light ring that the user-recognition device may project. The visible light ring may provide the user with a visual cue of where to place their palm to enable the user-recognition device to generate image data of the user's palm to identify the user.

FIG. 4 illustrates the visible light ring 302 that the user-recognition device 104 may project. As shown, the light ring 302 is projected onto and substantially centered on a user palm 402. The visible light ring 302 may provide the user with a visual cue of where to place their palm to enable the user-recognition device 104 to generate image data of the user's palm to identify the user.

Figure 5:
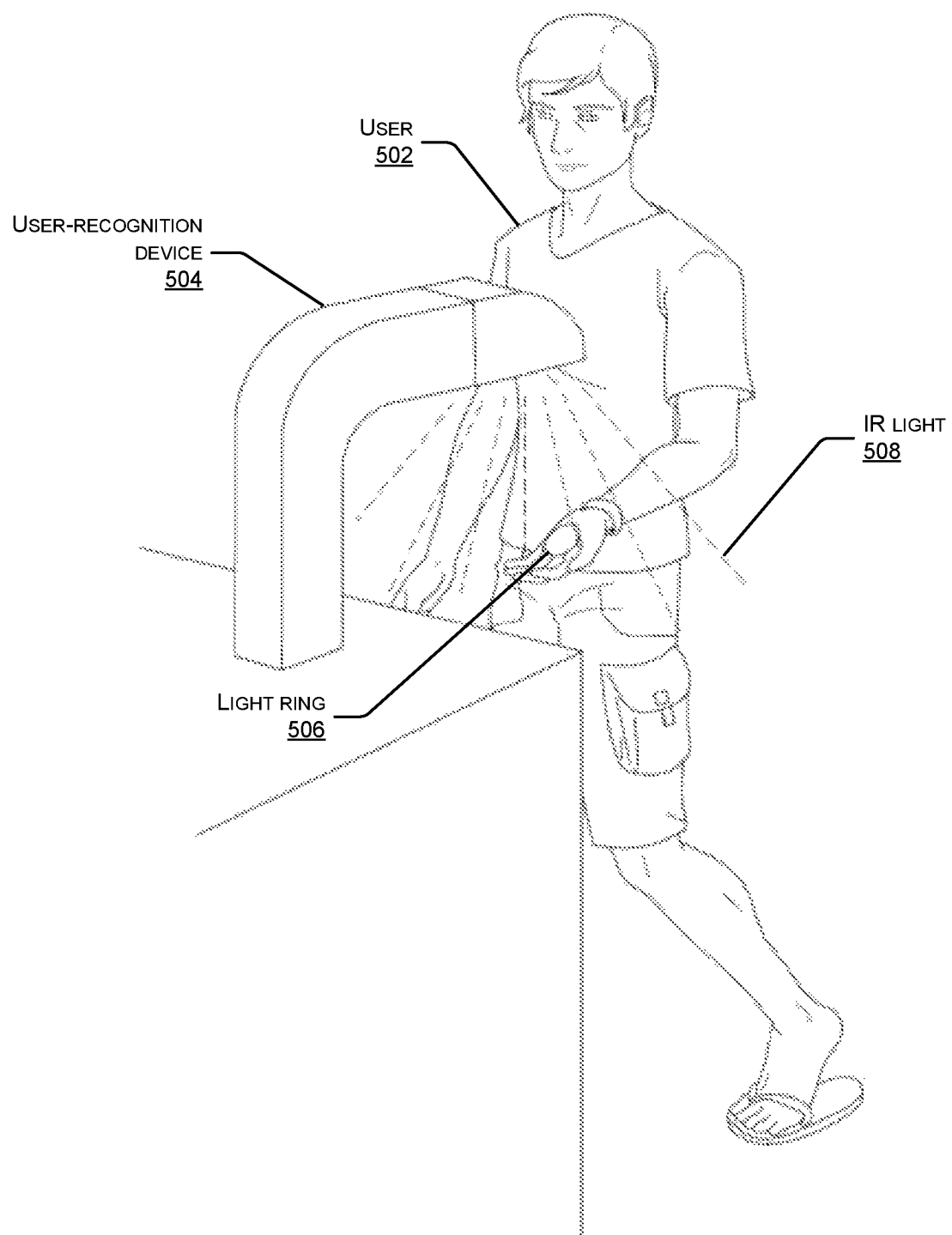
FIG. 5 illustrates another example implementation of a user-recognition device for identifying a user by generating image data of the palm of the user.

FIG. 5 illustrates another example implementation of a user-recognition device 504 for identifying a user by 502 generating image data of the palm of the user. This device 504 may have a form factor that is attached to or integrated to a table or other structure. As illustrated, this device 504, and the other user-recognition devices described and illustrated herein, include cameras and projectors that point substantially downwards. In addition to allowing the projection of a light ring 506 onto the palm of the user 502 to allow the user to intuitively center their palm in the appropriate location, the design of the device 504 may allow these devices to operate more robustly in outdoor locations. That is, because the components are generally aimed downwards, these components are generally protected from rain, hail, snow; and other types of inclement weather. Similar to the previous illustrations, FIG. 5 illustrates that the device 504 may project IR light 508 in addition to the light ring 506.

Figure 6:
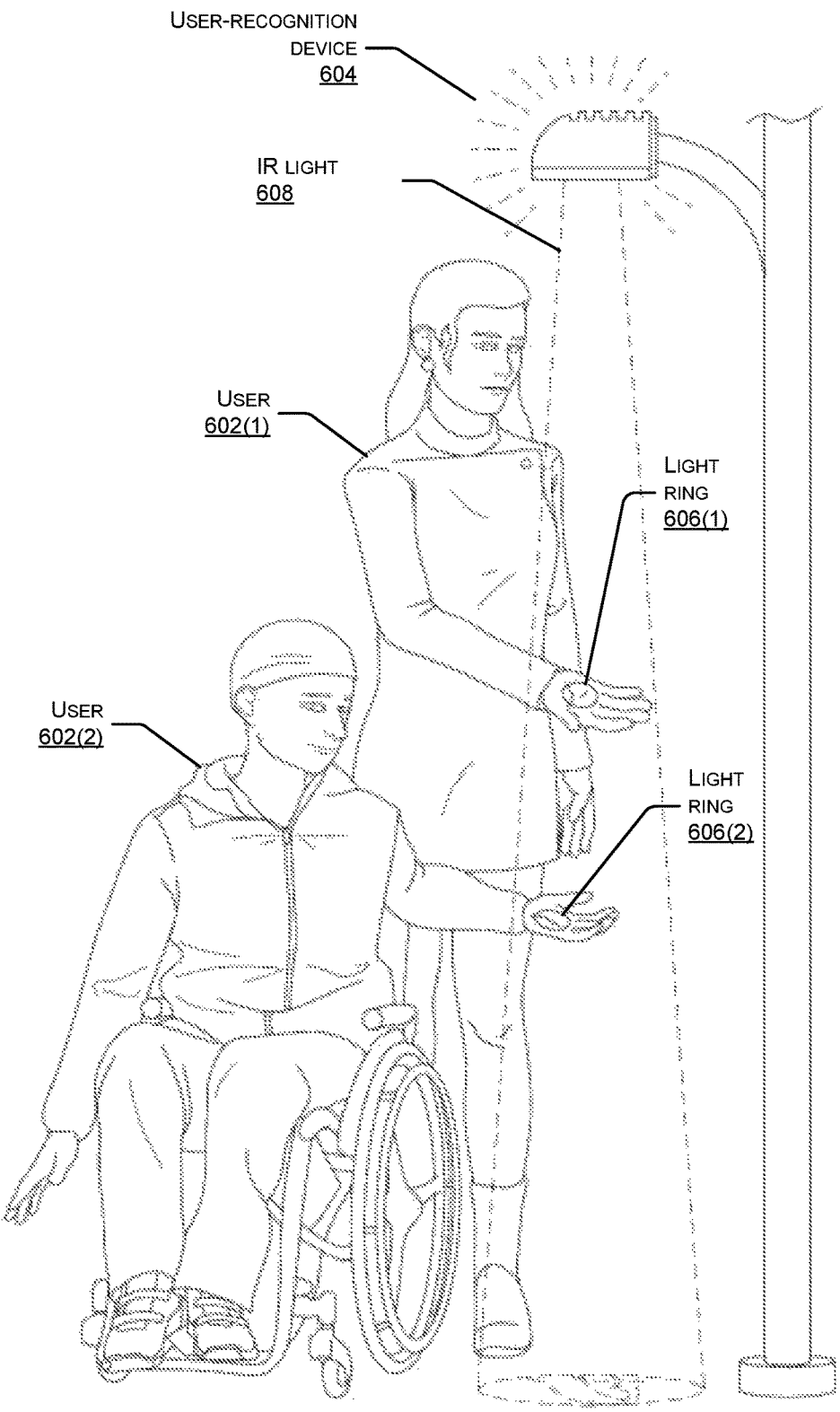
FIG. 6 illustrates another example implementation of a user-recognition device for identifying a user by generating image data of the palm of the user. As illustrated, the user-recognition device may operate at a range of working distances to enable recognition of users at a range of heights.

FIG. 6 illustrates another example implementation of a user-recognition device 604 for identifying users by generating image data of the respective palms of the users. As illustrated, the user-recognition device 604 may operate at a range of working distances to enable recognition of users at a range of heights. For instance, FIG. 6 illustrates that a first user 602(1) may place their palm within a FOV of the device 604 at a first height, while a second user 602(2) may place their palm within the FOV of the device 604, as a second, lesser height. Again, the device 604 may again project visible light (e.g., in the form of light rings 606(1) and 606(2)), as well as IR light 608. It is to be appreciated that while FIG. 6 illustrates two users at the device concurrently, this is for illustration purposes and each user may use the device 604 independently and serially.

Figure 7:
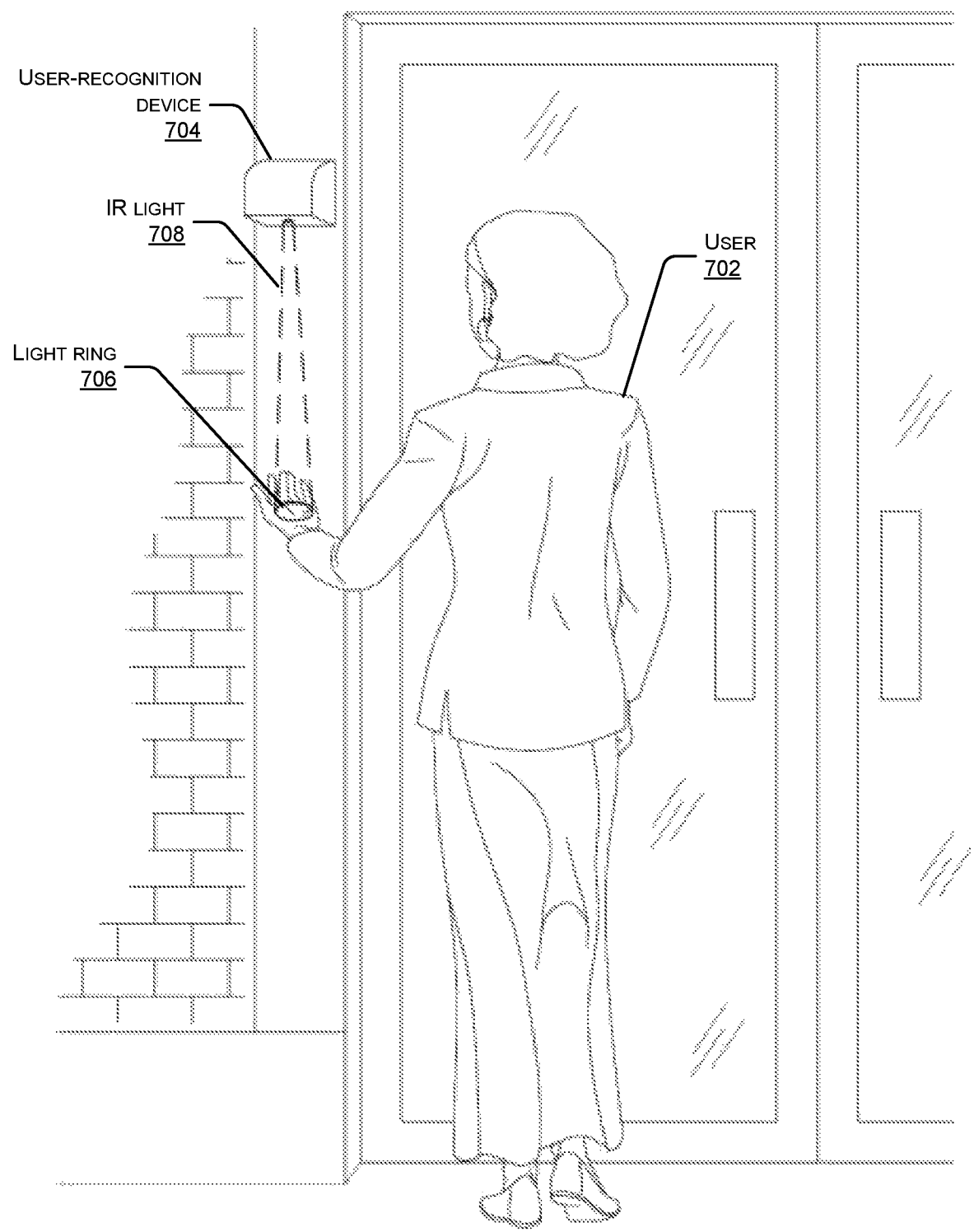
FIG. 7 illustrates another example implementation of a user-recognition device for identifying a user by generating image data of the palm of the user. In this example, the user-recognition device may be used to gain entry to a facility.

FIG. 7 illustrates another example implementation of a user-recognition device 704 for identifying a user 702 by generating image data of the palm of the user. In this example, the user-recognition device may be used to gain entry to a facility. As illustrated, the device 104 may have a form factor that attaches to a building or other structure. Further, and as discussed above, the user-recognition device 704 may be oriented downwards and, thus, may be protected from the weather. Again, the device 704 may project a light ring 706 and IR light 708. Further, while the above examples describe user-recognition devices that sit atop a table, affix to a horizontal or vertical surface, or the like, it is to be appreciated that the user-recognition device may take any other form factor. For instance, the user-recognition device may comprise a mobile, handheld scanner form factor. In these instances, the user-recognition device may include a trigger or other component for actuation by a user to cause the visible-light projector to project the visible light ring, to cause the IR projector to project the IR light, and to cause the RGB camera and the IR camera to generate the first and second image data, respectively.

Figure 8:
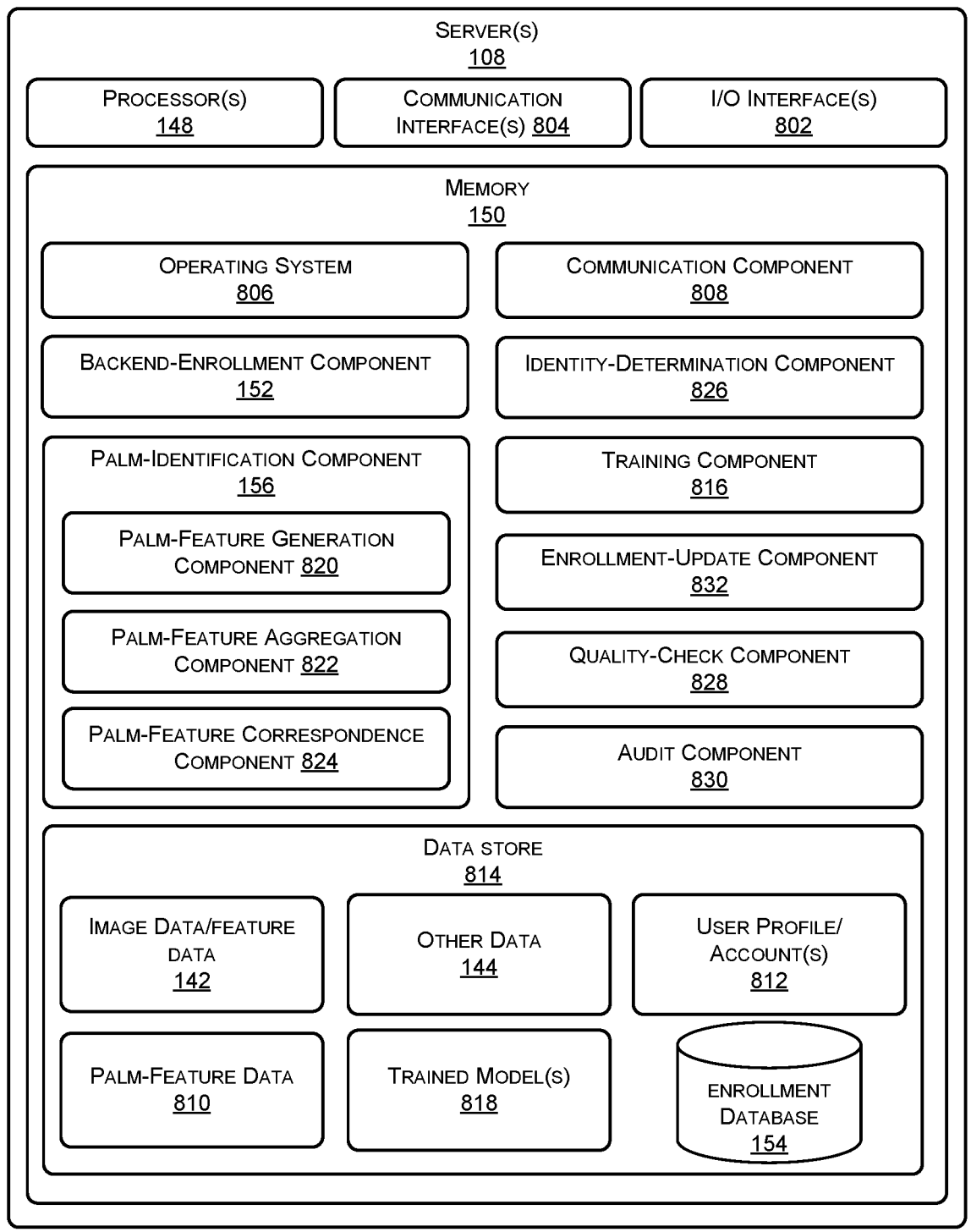
FIG. 8 illustrates example components of one or more servers configured to support at least a portion of the functionality of a user-recognition system.

FIG. 8 illustrates example components of one or more servers 108 configured to support at least a portion of the functionality of a user-recognition system. In some examples, the user-recognition system described herein may be supported entirely, or at least partially, by the user-recognition device 104 in conjunction with the servers 108. The server(s) 108 may be physically present at the facility 102, may be at a remote location accessible by the network 146, or a combination of both. The server(s) 108 do not require end-user knowledge of the physical location and configuration of the system that delivers the services. Common expressions associated with the server(s) 108 may include "on-demand computing." "software as a service (Saas)," "cloud services," "data centers," and so forth. Services provided by the server(s) 108 may be distributed across one or more physical or virtual devices.

The server(s) 108 may include one or more hardware processors 148 (processors) configured to execute one or more stored instructions. The processors 148 may comprise one or more cores. The server(s) 108 may include one or more input/output (I/O) interface(s) 802 to allow the processor 148 or other portions of the server(s) 108 to communicate with other devices. The I/O interfaces 802 may comprise Inter-Integrated Circuit (I2C), Serial Peripheral Interface bus (SPI), Universal Serial Bus (USB) as promulgated by the USB Implementers Forum, RS-232, and so forth.

The server(s) 108 may also include one or more communication interfaces 804. The communication interfaces 804 are configured to provide communications between the server(s) 108 and other devices, such as the user-recognition device 104, the interface devices, routers, and so forth. The communication interfaces 804 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi™, and so forth.

The server(s) 108 may also include one or more busses or other internal communications hardware or software that allow for the transfer of data between the various modules and components of the server(s) 108.

As shown in FIG. 8, the server(s) 108 includes one or more memories 150. The memory 150 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 150 provides storage of computer-readable instructions, data structures, program modules, and other data for the operation of the server(s) 108. A few example functional modules are shown stored in the memory 150, although the same functionality may alternatively be implemented in hardware, firmware, or as a system on a chip (SOC).

The memory 150 may include at least one operating system (OS) 806. The OS 806 is configured to manage hardware resource devices such as the I/O interfaces 802, I/O devices, the communication interfaces 804, and provide various services to applications or modules executing on the processors 148. The OS 806 may implement a variant of the FreeBSD™ operating system as promulgated by the FreeBSD Project: other UNIX™ or UNIX-like variants: a variation of the Linux™ operating system as promulgated by Linus Torvalds: the Windows® Server operating system from Microsoft Corporation of Redmond, Washington, USA; and so forth.

One or more of the following components may also be stored in the memory 150. These modules may be executed as foreground applications, background tasks, daemons, and so forth.

A communication component 808 may be configured to establish communications with one or more of the imaging sensors 116, the user-recognition devices 104, other server(s) 108, or other devices. The communications may be authenticated, encrypted, and so forth.

A backend-enrollment component 152 may be configured to perform various operations for enrolling a user 106 for use of the user-recognition system. For instance, the backend-enrollment component 152 may perform various operations, and/or cause other components to perform various operations, to enroll users 106 in the user-recognition system. In some instance, the backend-enrollment component 152 may at least partly control a palm-identification component 156 that performs operations for analyzing image data 142 depicting a palm or other portion of the user 106. In some examples, the backend-enrollment component 152 may cause the palm-identification component 156 to analyze the image data 142 and extract features which represent a palm of the user 106, such as palm-feature data 810.

After obtaining, determining, and/or generating the palm-feature data 810, the backend-enrollment component 152 may enroll the user 106 in an enrollment database 154 which indicates that the user 106 is enrolled for use of the user-recognition system. In some examples, the backend-enrollment component 152 may associate, or map, the various data to a user profile/account 812 that is associated with the user 106. For example, the backend-enrollment component 152 may map, for each enrolled user 106, respective palm-feature data 810 to corresponding user profiles 812 in the enrollment database 154. Thus, the enrollment database 154 may store indications of user profiles 812, as well as the data for users 106 associated with each of the user profiles 812. When a user 106 is enrolled for use of the user-recognition system, the backend-enrollment component 152 may map, or store an association, between the user's 106 palm-feature data 810 with the user profile 812 for that user 106. Further, the user profile 812 may include various information for the user 106, such as payment information to perform transactions for items 110 selected by the user 106 from the facility 102. The various types of data discussed herein may be stored in a data store 814 in the memory 150 of the server(s) 108, as illustrated in FIG. 8.

Further, the backend-enrollment component 152 may cause a training component 816 to train one or more trained models 818. The training component 816 may utilize the palm-feature data 810 to train the trained model(s) 818 to perform various operations for extracting and/or generating, from the image data 142, palm-feature data 810. The trained model(s) 818 may comprise any type of model, such as machine-learning models, including but not limited to artificial neural networks, classifiers, decision trees, support vector machines. Bayesian networks, and so forth.

As a specific example, the trained model(s) 818 may include or comprise one or more convolution neural networks (CNNs), recursive neural networks, and/or any other artificial networks, that are trained to analyze image data 142 received as input, and extract, determine, identify, generate, etc., palm-feature data 810 representing biometric characteristics of a palm of the user 106. As a specific example, the palm-feature data 810 may comprise a 128-dimension feature vector representing the biometric characteristic(s) of the palm of the user 106. In examples where the trained model(s) 818 include one or more CNNs, various functions may be utilized to transform the image data 142 into a metric space, such as a triplet loss function. Thus, the training component 816 may train the CNNs of the trained model(s) 818 using various functions, such as a triplet loss function, to extract, identity, or otherwise determine palm-feature data 810 from input image data 142. Once in the metric space, extracted feature data may be compared, or matched, by computing a distance between the extracted feature data and feature data stored in the enrollment database 154. For instance, when feature data is extracted from the image data 142 into palm-feature data 810 by the trained model(s) 818, the extracted palm-feature data 810 may then be compared to stored data in the enrollment database 154 to identify a user profile for the user 106 represented in the input image data 142. For instance, the extracted palm-feature data 810 may comprise a vector that is compared with stored vectors in the enrollment database 154 to identify which stored vectors have the smallest "distance" between the extracted feature data. The smaller the distance, the closer the strength of correspondence between the extracted feature data and the stored feature data representing users 106 that are enrolled for use of the user-recognition system. In some examples, other calculations may be performed, such as finding a cosine of an angle between two vectors, depending on the network utilized by the trained model(s) 818. However, any type of models may be utilized for the trained model(s) 818.

The palm-identification component 156 may include various sub-components for performing various operations. For instance, the palm-identification component 156 may include a palm-feature generation component 820 to extract or otherwise generate feature data from the image data 142. The palm-feature generation component 820 may utilize the trained model(s) 818, and/or include algorithms, to perform any type of feature extraction method, or embedding, to analyze the image data 142 and extract the palm-feature data 810. For instance, the palm-feature generation component 820 may utilize state-of-the-art models, such as clustering, artificial neural networks, scale-invariant feature transform, edge detection, or any other type of extraction or embedding technology, to extract palm-feature data 810 from the image data 142.

The palm-identification component 156 may further include a palm-feature aggregation component 822 configured to aggregate feature data for a user 106. For instance, the palm-feature aggregation component 822 may combine palm-feature data 810 that has been extracted from a group of images depicting the user 106, such as by averaging the features in the palm-feature data 810.

Once a user 106 is enrolled for use of the user-recognition system, an identity-determination component 826 may be utilized to determine and/or verify an identity of a user 106 that interacted with a user-recognition device 104. For example, the server(s) 108 may receive image data 142 from a user-recognition device 104 and the identity-determination component 826 may be configured to determine an identity of the user 106, where the enrollment database 154 indicates the identity of the user 106 by, for example, indicating the user profile 812 that is associated with that user's identity.

The identity-determination component 826 may cause a palm-feature correspondence component 824 to perform various operations for determining or identifying a user 106 whose palm is depicted in the received image data 142. For example, the palm-feature correspondence component 824 may compare the palm-feature data 810 for the received image data 142 with palm-feature data 810 stored in the enrollment database 154 for different user profiles 812 of users 106 enrolled in the user-recognition system in order to determine user profiles 812 for one or more users 106 whose respective palm-feature data 810 correspond to the extracted palm-feature data 810. In some instances, the score calculated by the palm-feature correspondence component 824 may be compared to a threshold and, if the score is greater than the threshold, may result in identification of the user. If multiple user profiles are associated with scores that are greater than the threshold, then the user profile associated with the highest may be deemed to be associated with the image data 142 and/or further analysis may be performed to identify the appropriate user. Further, in some instances, the user-recognition system may employ set-reduction techniques to identify, based on an initial comparison, a top "N" group of user profiles 812 of users 106 whose respective palm-feature data 810 most strongly correspond to the extracted palm-feature data 810. In some examples, a single user identity/profile 812 may be determined as corresponding to the input palm-feature data 810. However, in some examples a group of top "N" candidates may be identified by the trained model(s) 818 as corresponding with a threshold amount of strength (e.g., 50% correspondence, 75% correspondence, etc.) to the extracted palm-feature data 810. A second level of deeper analysis may then be performed to identify a single user from the "N" candidates.

Further, the memory 150 may store an enrollment-update component 832 configured to update the palm-feature data 810 stored in association with user profiles to allow for removal of stale feature data and use of more recent feature data and/or to otherwise allow for the update of the identification data (e.g., palm-feature data) stored in the enrollment database 154. The enrollment-update component 832 may store both current identification data (e.g., palm-feature data) and palm-feature data used in recognition attempts and may periodically perform clustering techniques on this set for determining whether and/or how to update identification data for one or more of the user profiles 812.

In addition, the memory 150 may store an audit component 830 configured to perform one or more auditing processes in response to occurrence of one or more predefined events. For example, the audit component 830 may perform a nightly auditing processes comprising rich comparison of palm-feature data associated with respective user profiles to one another to identify any errors previously made by the system. After identifying an error, the system may correct the error and may also use this information to further train the trained model(s) 818 utilizing techniques similar to those performed by the backend-enrollment component 152. In some instances, the audit component 830 may perform the clustering techniques described above with reference to the enrollment-update component 832 in order to identify these errors.

Additionally, the memory 150 may store a quality-check component 828 which determines an overall metric of the quality of the extracted palm-feature data 810. For instance, the quality-check component 828 may determine that additional image data 142 needs to be obtained for a user 106 for various reasons, such as a bandage or glove covering the palm of the user 106, or the like. In some examples, the quality-check component 828 may utilize a trained model(s) 818 to determine whether a feature vector is of sufficient quality and, if not, may cause the user-recognition device to request additional image data 142.

Figure 9:
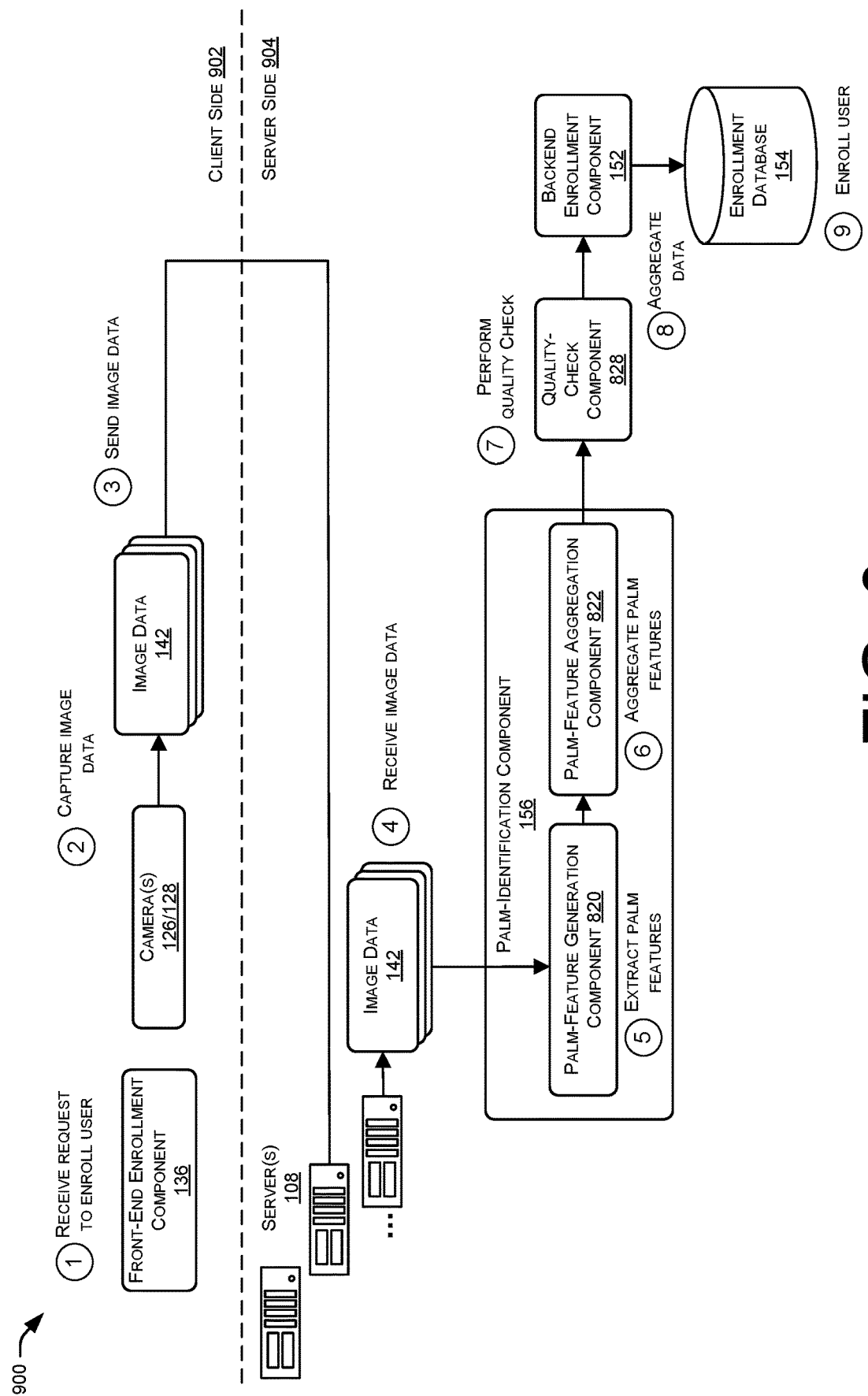
FIG. 9 illustrates an example environment including a block diagram of one or more servers configured to support at least a portion of the functionality of a user-recognition system, as well as an example flow of data within the system for enrolling a user with the user-recognition system.

FIG. 9 illustrates an example environment 900 including block diagram of one or more servers 108 configured to support at least a portion of the functionality of a user-recognition system, as well as an example flow of data within the system for enrolling a user 106 for use of the user-recognition system.

As illustrated, the environment 900 includes a client side 902 and a server side 904. However, this is merely illustrative, and some or all of the techniques may be performed entirely on the client side 902, or entirely on the server side 904. At "1," a front-end enrollment component 136 may receive a request to enroll a user 106 for use of the user-recognition system. For example, the request may comprise various types of input, such as a selection made via an I/O interface 124 (e.g., touch screen, mouse, keyboard, etc.) of a user interface element presented on a display for starting an enrollment process. Additionally, the front-end enrollment component 136 may detect a speech utterance from the user 106 indicating a request to enroll (e.g., "please enroll me," "I would like to check out," etc.). Another request example may include the user 106 sliding a user ID card into an I/O interface 124, such as a credit card, driver's license, etc. However, any type of input may be detected as a request by the front-end enrollment component 136.

Upon receiving the request to enroll, the front-end enrollment component 136 may activate or otherwise utilize the camera(s) 126 or 128 to generate image data 142 representing a palm of the user 106. At "2," the user-recognition device 104 then captures image data 142 and, at "3", sends the image data 142 to the server(s) 108. For instance, the user-recognition device 104 may encode and send the audio data and image data 142 over the network(s) 146 to the server(s) 108. Further, in some instances some of the images may be removed if they are not in focus, do not have a threshold level of discriminability of the characteristics of the palm of the user, or the like. This removal may occur on the client side 902 and/or the server side 904.

At "4," the servers receive the image data and/or the feature date and, at "5", the palm-feature generation component 820 may extract palm-feature data 810 from the image data 142. In some examples, prior to extracting the palm-feature data 810, the palm-feature generation component 820 may perform various operations for processing the image data 142 prior to extracting the palm-feature data 810. For instance, the palm-feature generation component 820 may initially perform user detection to determine that the image data 142 represents a palm of a user 106. For instance, the palm-feature generation component 820 may utilize an Integrated Sensor Processor (ISP) that performs hardware-based user detection techniques. In some examples, various software techniques may additionally, or alternatively be performed. In either instance, a bounding box may be output around the detected hand of the user 106 for an image depicting at least a portion of the user 106 and represented by the image data 142. Further, the palm-feature generation component 820 may perform hand-pose estimation in order to align the palm of the user 106 with a common coordinate system. After aligning the image of the hand into a common coordinate section, the portion of the image data corresponding to the palm may be identified and cropped. This remaining portion of the image data may thereafter be used to extract features therefrom by, for example, running a neural network on the cropped section of the image data. In some examples, hand-pose estimation may improve the extraction of features representing the palm of the user 106. Once the hand of the user 106 has been aligned, the palm-feature generation component 820 may extract features (e.g., palm-feature data 810) from the image data 142. In some examples, the trained model(s) 818 may utilize a triplet loss function which converts image data 142 into a feature embedding in a metric space (e.g., palm-feature data 810), which may allow for comparisons with subsequent feature vectors using, for example, squared distance calculation. Further, while this example describes the server side 904 generating the feature data, in some instances the components operating the client side 902 (e.g., on the user-recognition device 104) may generate the feature data and may send, to the servers, the feature data in addition to or instead of the image data.

At "6," the palm-feature aggregation component 822 may aggregate feature data (e.g., palm-feature data 810) from various image data 142. For instance, the image data 142 may represent the hand of the user 106 at different angles, under different lighting conditions, or other differing characteristics. The palm-feature aggregation component 822 may aggregate the palm-feature data 810 together, such as by averaging out feature vectors.

At "7," the quality-check component 828 may perform a quality check on the palm-feature data. For example, the quality-check component 828 may utilize a trained model(s) 818 to determine an overall metric of the quality of the extracted palm-feature data 810. If the overall metric is poor, or below a threshold quality level, the user-recognition system may request to acquire additional image data 142. In addition, or in the alternative, the quality-check component 828 may perform a de-duping process to ensure that the user associated with the palm-feature data hasn't already enrolled in the system. If the overall quality metric is good or acceptable, and if the de-duping process does not reveal that the user has previously enrolled in the system, the backend enrollment component 144 may aggregate the data at "8."

For example, at "8" the backend-enrollment component 152 may aggregate the palm-feature data 810 and enroll the user at "9" in the enrollment database 154. The backend-enrollment component 152 may store associations (e.g., mappings) between the palm-feature data 810 with a user profile 812 of the user 106 requesting to be enrolled for use of the user-recognition system.

Figure 10:
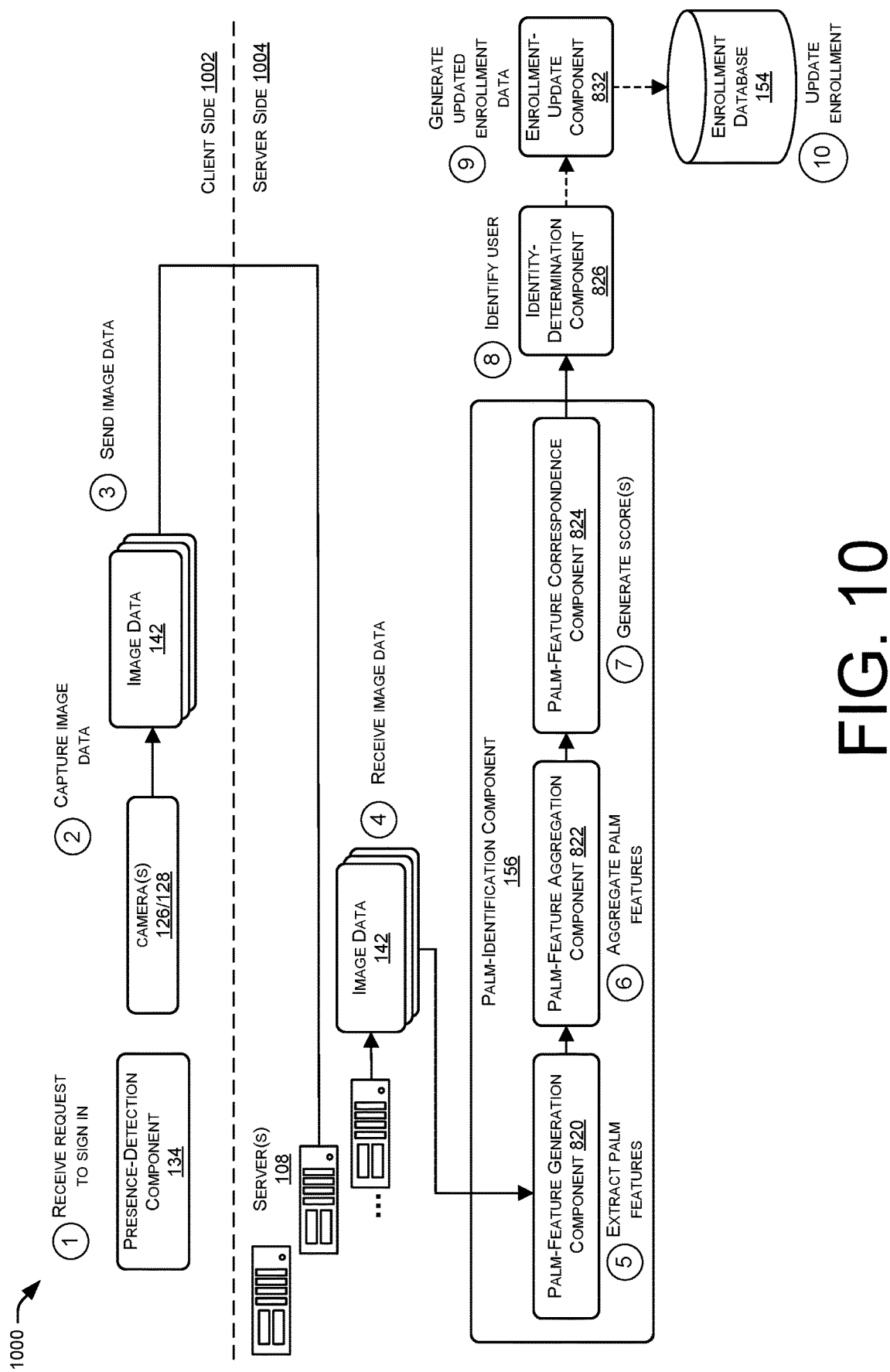
FIG. 10 illustrates an example environment including a block diagram of one or more servers configured to support at least a portion of the functionality of a user-recognition system, as well as an example flow of data within the system for identifying a user of the user-recognition system and, potentially, updating the enrollment of the user.

FIG. 10 illustrates an example environment 1000 including a block diagram of one or more servers 108 configured to support at least a portion of the functionality of a user-recognition system, as well as an example flow of data within the system for identifying a user 106 of the user-recognition system and, potentially, updating the enrollment of the user. As illustrated, the environment 600 includes a client side 1002 and a server side 1004. However, this is merely illustrative, and some or all of the techniques may be performed entirely on the client side 1002, or entirely on the server side 1004.

At "1." a user requests to sign in with the user-recognition system. For example, the presence-detection component 134 may be executable by the processor(s) 120 to detect a trigger indicating presence of the user 106. The trigger detected by the presence-detection component 134 may comprise one or more types of input. For instance, the presence-detection component 134 may include logic to detect, using one or more cameras 126/128, a portion of a user 106 (e.g., a hand beneath the camera(s) of the user-recognition device 104). Other examples of triggers detected by the presence-detection component 134 that may indicate the presence of the user 106 may include receiving touch input (or other input, such as a mouse click) via one or more I/O interfaces 124 of the user-recognition device 104. However, any type of input may be detected as a trigger by the presence-detection component 134.

Upon identifying the request to sign in from the user, at "2" one or more camera(s) 126/128 may generate image data 142 representing a palm of the user 106 and/or another portion of the user. At "3," the user-recognition device 104 may send the image data 142 to the server(s) 108. For instance, the user-recognition device 104 may encode and send the image data 142 over the network(s) 146 to the server(s) 108. Again, some of the image data 142 may be discarded based on the image data being out of focus, having a discriminability that is less than the threshold, and/or the like.

At "4." the servers may receive the image data 142 and, at "5", the palm-feature generation component 820 may extract palm-feature data 810 from the image data 142. In some examples, prior to extracting the palm-feature data 810, the palm-feature generation component 820 may perform various operations for processing the image data 142 prior to extracting the palm-feature data 810. For instance, the palm-feature generation component 820 may initially perform palm detection to determine that the image data 142 represents a hand of a user 106. For instance, the palm-feature generation component 820 may utilize an Integrated Sensor Processor (ISP) that performs hardware-based user detection techniques. In some examples, various software techniques may additionally, or alternatively be performed. In either instance, a bounding box may be output around the detected hand of the user 106 for an image depicting the user 106 and represented by the image data 142. Further, the palm-feature generation component 820 may perform hand pose estimation to align the face of the user 106 with a common coordinate system. In some examples, hand pose estimation may improve the extraction of features representing the hand of the user 106. Once the hand of the user 106 has been aligned, the palm-feature generation component 820 may extract features (e.g., palm-feature data 810) from the image data 142. In some examples, the trained model(s) 818 may utilize a triplet loss function which converts the image data 142 into a feature embedding in a metric space (e.g., palm-feature data 810), which may allow for comparisons with subsequent feature vectors using, for example, squared distance calculation. Further, while this example describes the server side 1004 generating the feature data, in some instances the components operating the client side 1002 (e.g., on the user-recognition device 104) may generate the feature data and may send, to the servers, the feature data in addition to or instead of the image data.

At "6," the palm-feature aggregation component 822 may aggregate feature data (e.g., palm-feature data 810) from various image data 142. For instance, the image data 142 may represent the hand of the user 106 at different angles, under different lighting conditions, or other differing characteristics. The palm-feature aggregation component 822 may aggregate the palm-feature data 810 together, such as by averaging out feature vectors.

At "7," the palm-feature correspondence component 824 may generate one or more scores indicating a similarity between the aggregated features associated with the image data 142 and respective feature data stored in association with respective user profiles. In some examples, these correspondence scores may be determined, at least in part, on "distances" between the feature vector associated with the image data and respective feature vectors of the respective palm-feature data 810 stored in association with user profiles in the enrollment database 154.

At "8," the identity-determination component 826 may determine the identity of the user based on the correspondence scores. For example, the identity-determination component 826 may identity the user profile associated with the feature vector having the closest distance to the feature vector associated with the image data 142 and may deem the associated user the user associated with the image data 142.

At "9", in some instances the enrollment-update component 832 may update identification data stored in the enrollment database 154, such as nightly, weekly, or the like, or in response to detecting occurrence of a predefined event that results in the updating of the enrollment database 154.

At "10", the enrollment-update component 832 updates the identification data associated with one or more user profiles in the enrollment database 154. This may include storing the new identification data and/or image data alongside existing identification data and/or image data associated with the profile, averaging the existing identification data with the new identification data, and/or the like.

Figure 11:
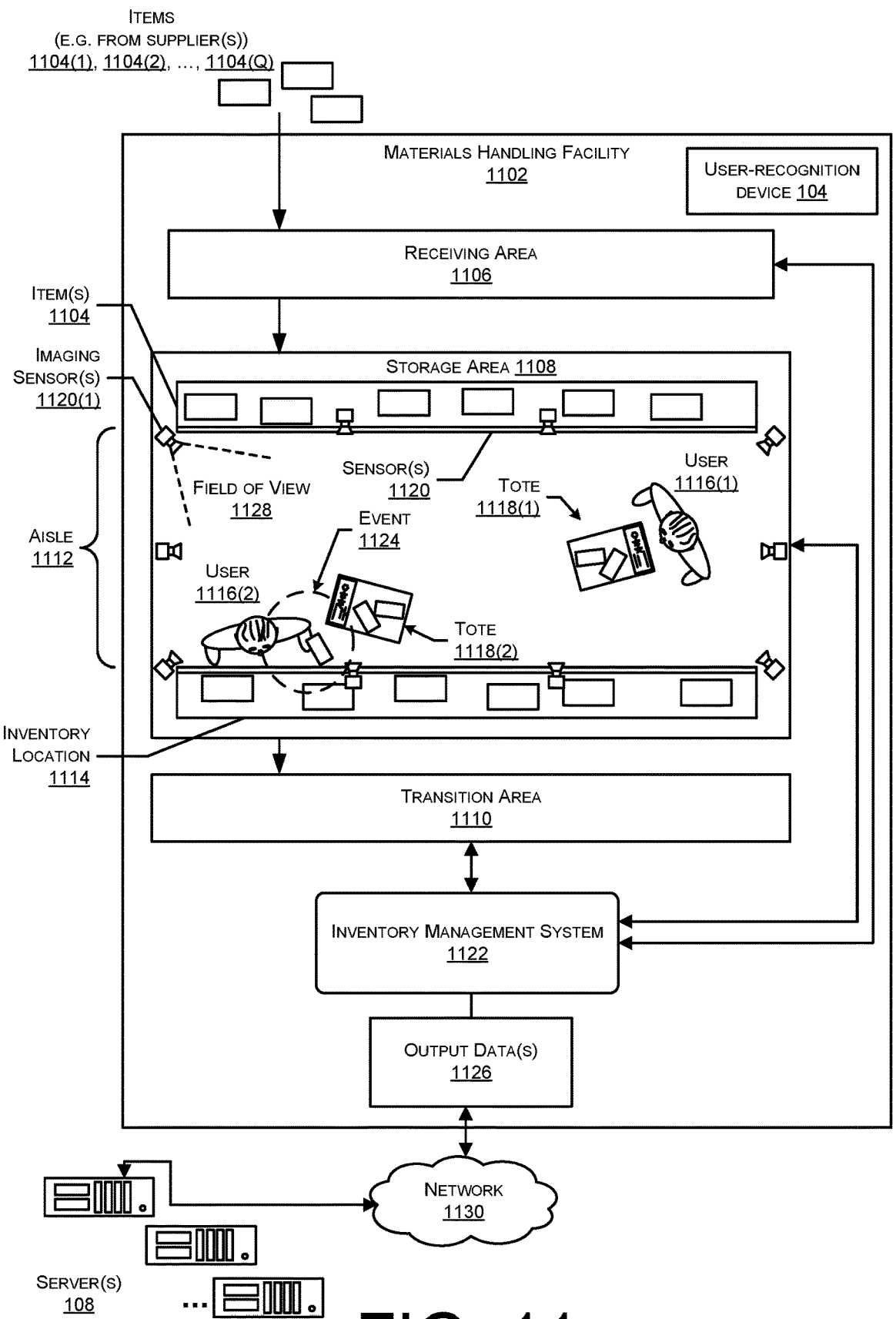
FIG. 11 is a block diagram of an example materials handling facility that includes sensors and an inventory management system configured to generate output regarding events occurring in the facility using the sensor data.
Figure 12:
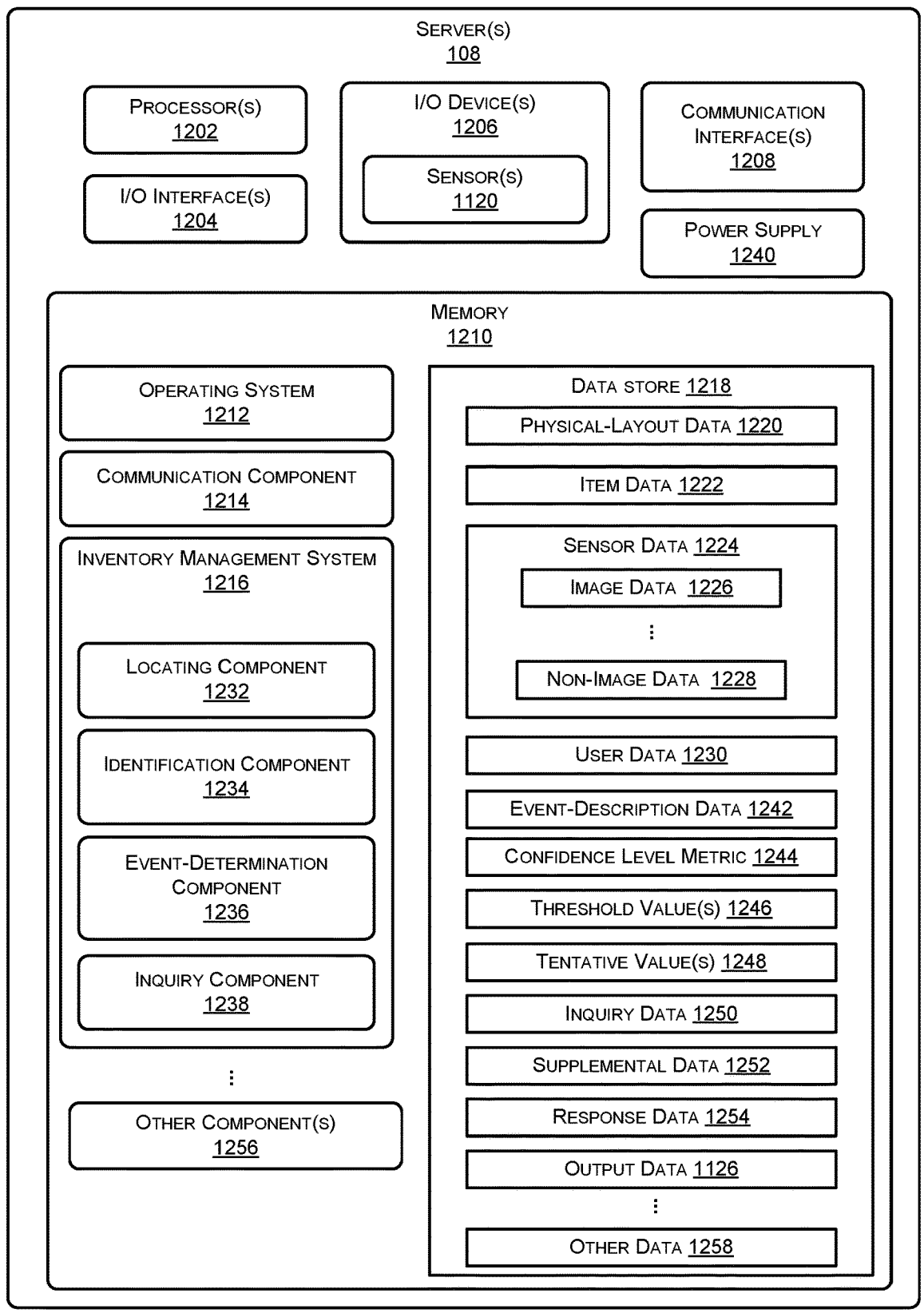
FIG. 12 illustrates a block diagram of one or more servers configured to support operation of the facility.

FIGS. 11 and 12 represent an illustrative materials handling environment, such as the materials handling facility 102, that may include the user-recognition device 104. However, the following description is merely one illustrative example of an industry and environment in which the techniques described herein may be utilized.

An implementation of a materials handling facility 1102 (e.g., facility 102) configured to store and manage inventory items is illustrated in FIG. 11. A materials handling facility 1102 (facility) comprises one or more physical structures or areas within which one or more items 1104(1), 1104(2), . . . 1104(Q)(generally denoted as 1104) may be held. As used in this disclosure, letters in parenthesis such as "(Q)" indicate an integer result. The items 1104 comprise physical goods, such as books, pharmaceuticals, repair parts, electronic gear, groceries, and so forth.

The facility 1102 may include one or more areas designated for different functions with regard to inventory handling. In this illustration, the facility 1102 includes a receiving area 1106, a storage area 1108, and a transition area 1110. The receiving area 1106 may be configured to accept items 1104, such as from suppliers, for intake into the facility 1102. For example, the receiving area 1106 may include a loading dock at which trucks or other freight conveyances unload the items 1104.

The storage area 1108 is configured to store the items 1104. The storage area 1108 may be arranged in various physical configurations. In one implementation, the storage area 1108 may include one or more aisles 1112. The aisle 1112 may be configured with, or defined by, inventory locations 1114 on one or both sides of the aisle 1112. The inventory locations 1114 may include one or more of shelves, racks, cases, cabinets, bins, floor locations, or other suitable storage mechanisms for holding or storing the items 1104. The inventory locations 1114 may be affixed to the floor or another portion of the facility's structure, or may be movable such that the arrangements of aisles 1112 may be reconfigurable. In some implementations, the inventory locations 1114 may be configured to move independently of an outside operator. For example, the inventory locations 1114 may comprise a rack with a power source and a motor, operable by a computing device to allow the rack to move from one location within the facility 1102 to another.

One or more users 1116(1), 1116(2), ... 1116(U), totes 1118(1), 1118(2), 1118(T)(generally denoted as 1118) or other material handling apparatus may move within the facility 1102. For example, the users 1116 may move about within the facility 1102 to pick or place the items 1104 in various inventory locations 1114, placing them on the totes 1118 for ease of transport. An individual tote 1118 is configured to carry or otherwise transport one or more items 1104. For example, a tote 1118 may include a basket, a cart, a bag, and so forth. In other implementations, other agencies such as robots, forklifts, cranes, aerial drones, and so forth, may move about the facility 1102 picking, placing, or otherwise moving the items 1104.

One or more sensors 1120 may be configured to acquire information in the facility 1102. The sensors 1120 in the facility 1102 may include sensors fixed in the environment (e.g., ceiling-mounted cameras) or otherwise, such as sensors in the possession of users (e.g., mobile phones, tablets, etc.). The sensors 1120 may include, but are not limited to, cameras 1120(1), weight sensors, radio frequency (RF) receivers, temperature sensors, humidity sensors, vibration sensors, and so forth. The sensors 1120 may be stationary or mobile, relative to the facility 1102. For example, the inventory locations 1114 may contain cameras 1120(1) configured to acquire images of pick or placement of items 1104 on shelves, of the users 1116(1) and 1116(2) in the facility 1102, and so forth. In another example, the floor of the facility 1102 may include weight sensors configured to determine a weight of the users 1116 or other object thereupon.

During operation of the facility 1102, the sensors 1120 may be configured to provide information suitable for identifying new locations of objects or other occurrences within the facility 1102. For example, a series of images acquired by a camera 1120(1) may indicate removal of an item 1104 from a particular inventory location 1114 by one of the users 1116 and placement of the item 1104 on or at least partially within one of the totes 1118.

While the storage area 1108 is depicted as having one or more aisles 1112, inventory locations 1114 storing the items 1104, sensors 1120, and so forth, it is understood that the receiving area 1106, the transition area 1110, or other areas of the facility 1102 may be similarly equipped. Furthermore, the arrangement of the various areas within the facility 1102 is depicted functionally rather than schematically. For example, multiple different receiving areas 1106, storage areas 1108, and transition areas 1110 may be interspersed rather than segregated in the facility 1102.

The facility 1102 may include, or be coupled to, an inventory management system 1122. The inventory management system 1122 is configured to identify interactions with and between users 1116, devices such as sensors 1120, robots, material handling equipment, computing devices, and so forth, in one or more of the receiving area 1106, the storage area 1108, or the transition area 1110. These interactions may include one or more events 1124. For example, events 1124 may include the entry of the user 1116 to the facility 1102, stocking of items 1104 at an inventory location 1114, picking of an item 1104 from an inventory location 1114, returning of an item 1104 to an inventory location 1114, placement of an item 1104 within a tote 1118, movement of users 1116 relative to one another, gestures by the users 1116, and so forth. Other events 1124 involving users 1116 may include the user 1116 providing authentication information in the facility 1102, using a computing device at the facility 1102 to authenticate identity to the inventory management system 1122, and so forth. Some events 1124 may involve one or more other objects within the facility 1102. For example, the event 1124 may comprise movement within the facility 1102 of an inventory location 1114, such as a counter mounted on wheels. Events 1124 may involve one or more of the sensors 1120. For example, a change in operation of a sensor 1120, such as a sensor failure, change in alignment, and so forth, may be designated as an event 1124. Continuing the example, movement of a camera 1120(1) resulting in a change in the orientation of the field of view 1128(such as resulting from someone or something bumping the camera 1120(1))(e.g. camera) may be designated as an event 1124.

By determining the occurrence of one or more of the events 1124, the inventory management system 1122 may generate output data 1126. The output data 1126 comprises information about the event 1124. For example, where the event 1124 comprises an item 1104 being removed from an inventory location 1114, the output data 1126 may comprise an item identifier indicative of the particular item 1104 that was removed from the inventory location 1114 and a user identifier of a user that removed the item.

The inventory management system 1122 may use one or more automated systems to generate the output data 1126. For example, an artificial neural network, one or more classifiers, or other automated machine learning techniques may be used to process the sensor data from the one or more sensors 1120 to generate output data 1126. The automated systems may operate using probabilistic or non-probabilistic techniques. For example, the automated systems may use a Bayesian network. In another example, the automated systems may use support vector machines to generate the output data 1126 or the tentative results. The automated systems may generate confidence level data that provides information indicative of the accuracy or confidence that the output data 1126 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 135%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1104, user 1116, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1116 may pick an item 1104(1) such as a perfume bottle that is generally cubical in shape from the inventory location 1114. Other items 1104 at nearby inventory locations 1114 may be predominately spherical. Based on the difference in shape (cube vs. sphere) from the adjacent items, and the correspondence in shape with the previously stored image of the perfume bottle item 1104(1)(cubical and cubical), the confidence level that the user 1116 has picked up the perfume bottle item 1104(1) is high.

In some situations, the automated techniques may be unable to generate output data 1126 with a confidence level above a threshold result. For example, the automated techniques may be unable to distinguish which user 1116 in a crowd of users 1116 has picked up the item 1104 from the inventory location 1114. In other situations, it may be desirable to provide human confirmation of the event 1124 or of the accuracy of the output data 1126. For example, some items 1104 may be deemed age restricted such that they are to be handled only by users 1116 above a minimum age threshold.

In instances where human confirmation is desired, sensor data associated with an event 1124 may be processed to generate inquiry data. The inquiry data may include a subset of the sensor data associated with the event 1124. The inquiry data may also include one or more of one or more tentative results as determined by the automated techniques, or supplemental data. The subset of the sensor data may be determined using information about the one or more sensors 1120. For example, camera data such as the location of the camera 1120(1) within the facility 1102, the orientation of the camera 1120(1), and a field of view 1128 of the camera 1120(1) may be used to determine if a particular location within the facility 1102 is within the field of view 1128. The subset of the sensor data may include images that may show the inventory location 1114 or that the item 1104 was stowed. The subset of the sensor data may also omit images from other cameras 1120(1) that did not have that inventory location 1114 in the field of view 1128. The field of view 1128 may comprise a portion of the scene in the facility 1102 that the sensor 1120 is able to generate sensor data about.

Continuing the example, the subset of the sensor data may comprise a video clip acquired by one or more cameras 1120(1) having a field of view 1128 that includes the item 1104. The tentative results may comprise the "best guess" as to which items 1104 may have been involved in the event 1124. For example, the tentative results may comprise results determined by the automated system that have a confidence level above a minimum threshold.

The facility 1102 may be configured to receive different kinds of items 1104 from various suppliers and to store them until a customer orders or retrieves one or more of the items 1104. A general flow of items 1104 through the facility 1102 is indicated by the arrows of FIG. 10. Specifically, as illustrated in this example, items 1104 may be received from one or more suppliers, such as manufacturers, distributors, wholesalers, and so forth, at the receiving area 1106. In various implementations, the items 1104 may include merchandise, commodities, perishables, or any suitable type of item 1104, depending on the nature of the enterprise that operates the facility 1102. The receiving of the items 1104 may comprise one or more events 1124 for which the inventory management system 1122 may generate output data 1126.

Upon being received from a supplier at receiving area 1106, the items 1104 may be prepared for storage. For example, items 1104 may be unpacked or otherwise rearranged. The inventory management system 1122 may include one or more software applications executing on a computer system to provide inventory management functions based on the events 1124 associated with the unpacking or rearrangement. These inventory management functions may include maintaining information indicative of the type, quantity, condition, cost, location, weight, or any other suitable parameters with respect to the items 1104. The items 1104 may be stocked, managed, or dispensed in terms of countable, individual units or multiples, such as packages, cartons, crates, pallets, or other suitable aggregations. Alternatively, some items 1104, such as bulk products, commodities, and so forth, may be stored in continuous or arbitrarily divisible amounts that may not be inherently organized into countable units. Such items 1104 may be managed in terms of measurable quantity such as units of length, area, volume, weight, time, duration, or other dimensional properties characterized by units of measurement. Generally speaking, a quantity of an item 1104 may refer to either a countable number of individual or aggregate units of an item 1104 or a measurable amount of an item 1104, as appropriate.

After arriving through the receiving area 1106, items 1104 may be stored within the storage area 1108. In some implementations, like items 1104 may be stored or displayed together in the inventory locations 1114 such as in bins, on shelves, hanging from pegboards, and so forth. In this implementation, all items 1104 of a given kind are stored in one inventory location 1114. In other implementations, like items 1104 may be stored in different inventory locations 1114. For example, to optimize retrieval of certain items 1104 having frequent turnover within a large physical facility 1102, those items 1104 may be stored in several different inventory locations 1114 to reduce congestion that might occur at a single inventory location 1114. Storage of the items 1104 and their respective inventory locations 1114 may comprise one or more events 1124.

When a customer order specifying one or more items 1104 is received, or as a user 1116 progresses through the facility 1102, the corresponding items 1104 may be selected or "picked" from the inventory locations 1114 containing those items 1104. In various implementations, item picking may range from manual to completely automated picking. For example, in one implementation, a user 1116 may have a list of items 1104 they desire and may progress through the facility 1102 picking items 1104 from inventory locations 1114 within the storage area 1108, and placing those items 1104 into a tote 1118. In other implementations, employees of the facility 1102 may pick items 1104 using written or electronic pick lists derived from customer orders. These picked items 1104 may be placed into the tote 1118 as the employee progresses through the facility 1102. Picking may comprise one or more events 1124, such as the user 1116 in moving to the inventory location 1114, retrieval of the item 1104 from the inventory location 1114, and so forth.

After items 1104 have been picked, they may be processed at a transition area 1110. The transition area 1110 may be any designated area within the facility 1102 where items 1104 are transitioned from one location to another or from one entity to another. For example, the transition area 1110 may be a packing station within the facility 1102. When the item 1104 arrives at the transition area 1110, the items 1104 may be transitioned from the storage area 1108 to the packing station. The transitioning may comprise one or more events 1124. Information about the transition may be maintained by the inventory management system 1122 using the output data 1126 associated with those events 1124.

In another example, if the items 1104 are departing the facility 1102 a list of the items 1104 may be obtained and used by the inventory management system 1122 to transition responsibility for, or custody of, the items 1104 from the facility 1102 to another entity. For example, a carrier may accept the items 1104 for transport with that carrier accepting responsibility for the items 1104 indicated in the list. In another example, a customer may purchase or rent the items 1104 and remove the items 1104 from the facility 1102. The purchase or rental may comprise one or more events 1124.

The inventory management system 1122 may access or generate sensor data about the facility 1102 and the contents therein including the items 1104, the users 1116, the totes 1118, and so forth. The sensor data may be acquired by one or more of the sensors 1120, data provided by other systems, and so forth. For example, the sensors 1120 may include cameras 1120(1) configured to acquire image data of scenes in the facility 1102. The image data may comprise still images, video, or a combination thereof. The image data may be processed by the inventory management system 1122 to determine a location of the user 1116, the tote 1118, the identity of the user 1116, and so forth. As used herein, the identity of the user may represent a unique identifier of the user (e.g., name, number associated with user, username, etc.), an identifier that distinguishes the user amongst other users being identified with the environment, or the like.

The inventory management system 1122, or systems coupled thereto, may be configured to identify the user 1116, as well as to determine other candidate users. In one implementation, this determination may comprise comparing sensor data with previously stored identity data. For example, the user 1116 may be identified by showing their face to a facial recognition system, by presenting a token carrying authentication credentials, providing a fingerprint, scanning a barcode or other type of unique identifier upon entering the facility, and so forth. Identity of the user 1116 may be determined before, during, or after entry to the facility 1102. Determination of the user's 1116 identity may comprise comparing sensor data associated with the user 1116 in the facility 1102 to previously stored user data.

In some instances, the inventory management system group users within the facility into respective sessions. That is, the inventory management system 1122 may utilize the sensor data to determine groups of users that are effectively "together" (e.g., shopping together). In some instances, a particular session may include multiple users that entered the facility 1102 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 1118. Noting the child and the mother as belonging to the same session may increase the chances of successfully adding the box of cereal to the virtual shopping cart of the mother.

By determining the occurrence of one or more events 1124 and the output data 1126 associated therewith, the inventory management system 1122 is able to provide one or more services to the users 1116 of the facility 1102. By utilizing one or more human associates to process inquiry data and generate response data that may then be used to produce output data 1126, overall accuracy of the system may be enhanced. The enhanced accuracy may improve the user experience of the one or more users 1116 of the facility 1102. In some examples, the output data 1126 may be transmitted over a network 1130 to one or more servers 108.

FIG. 12 illustrates a block diagram of the one or more servers 108. The servers 108 may be physically present at the facility 1102, may be accessible by the network 1130, or a combination of both. The servers 108 do not require end-user knowledge of the physical location and configuration of the system that delivers the services. Common expressions associated with the servers 108 may include "on-demand computing," "software as a service (SaaS)," "cloud services," "data centers," and so forth. Services provided by the servers 108 may be distributed across one or more physical or virtual devices.

The servers 108 may include one or more hardware processors 1202 (processors) configured to execute one or more stored instructions. The processors 1202 may comprise one or more cores. The servers 108 may include one or more input/output (I/O) interface(s) 1204 to allow the processor 1202 or other portions of the servers 108 to communicate with other devices. The I/O interfaces 1204 may comprise Inter-Integrated Circuit (I2C), Serial Peripheral Interface bus (SPI), Universal Serial Bus (USB) as promulgated by the USB Implementers Forum, and so forth.

The servers 108 may also include one or more communication interfaces 1208. The communication interfaces 1208 are configured to provide communications between the servers 108 and other devices, such as the sensors 1120, the interface devices, routers, and so forth. The communication interfaces 1206 may include devices configured to couple to personal area networks (PANs), wired and wireless local area networks (LANs), wired and wireless wide area networks (WANs), and so forth. For example, the communication interfaces 1208 may include devices compatible with Ethernet, Wi-Fi™, and so forth. The servers 108 may also include one or more busses or other internal communications hardware or software that allow for the transfer of data between the various modules and components of the servers 108.

The servers 108 may also include a power supply 1240. The power supply 1240 is configured to provide electrical power suitable for operating the components in the servers 108.

As shown in FIG. 12, the servers 108 includes one or more memories 1210. The memory 1210 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1210 provides storage of computer-readable instructions, data structures, program modules, and other data for the operation of the servers 108. A few example functional modules are shown stored in the memory 1210, although the same functionality may alternatively be implemented in hardware, firmware, or as a system on a chip (SOC).

The memory 1210 may include at least one operating system (OS) component 1212. The OS component 1212 is configured to manage hardware resource devices such as the I/O interfaces 1204, the communication interfaces 1208, and provide various services to applications or components executing on the processors 1202. The OS component 1212 may implement a variant of the FreeBSD™ operating system as promulgated by the FreeBSD Project: other UNIX™ or UNIX-like variants; a variation of the Linux™ operating system as promulgated by Linus Torvalds: the Windows® Server operating system from Microsoft Corporation of Redmond, Washington, USA; and so forth.

One or more of the following components may also be stored in the memory 1210. These components may be executed as foreground applications, background tasks, daemons, and so forth. A communication component 1214 may be configured to establish communications with one or more of the sensors 1120, one or more of the devices used by associates, other servers 108, or other devices. The communications may be authenticated, encrypted, and so forth.

The memory 1210 may store an inventory management system 1216. The inventory management system 1216 is configured to provide the inventory functions as described herein with regard to the inventory management system 1122. For example, the inventory management system 1216 may determine movement of items 1104 in the facility 1102, generate user interface data, and so forth.

The inventory management system 1216 may access information stored in one or more data stores 1218 in the memory 1210. The data store 1218 may use a flat file, database, linked list, tree, executable code, script, or other data structure to store the information. In some implementations, the data store 1218 or a portion of the data store 1218 may be distributed across one or more other devices including other servers 108, network attached storage devices, and so forth.

The data store 1218 may include physical layout data 1220. The physical layout data 1220 provides a mapping of physical locations within the physical layout of devices and objects such as the sensors 1120, inventory locations 1114, and so forth. The physical layout data 1220 may indicate the coordinates within the facility 1102 of an inventory location 1114, sensors 1120 within view of that inventory location 1114, and so forth. For example, the physical layout data 1220 may include camera data comprising one or more of a location within the facility 1102 of a camera 1120(1), orientation of the camera 1120(1), the operational status, and so forth. Continuing example, the physical layout data 1220 may indicate the coordinates of the camera 1120(1), pan and tilt information indicative of a direction that the field of view 1128 is oriented along, whether the camera 1120(1) is operating or malfunctioning, and so forth.

In some implementations, the inventory management system 1216 may access the physical layout data 1220 to determine if a location associated with the event 1124 is within the field of view 1128 of one or more sensors 1120. Continuing the example above, given the location within the facility 1102 of the event 1124 and the camera data, the inventory management system 1216 may determine the cameras 1120(1) that may have generated images of the event 1124.

The item data 1222 comprises information associated with the items 1104. The information may include information indicative of one or more inventory locations 1114 at which one or more of the items 1104 are stored. The item data 1222 may also include order data, SKU or other product identifier, price, quantity on hand, weight, expiration date, images of the item 1104, detail description information, ratings, ranking, and so forth. The inventory management system 1216 may store information associated with inventory management functions in the item data 1222.

The data store 1218 may also include sensor data 1224. The sensor data 1224 comprises information acquired from, or based on, the one or more sensors 1120. For example, the sensor data 1224 may comprise 3D information about an object in the facility 1102. As described above, the sensors 1120 may include a camera 1120(1), which is configured to acquire one or more images. These images may be stored as the image data 1226. The image data 1226 may comprise information descriptive of a plurality of picture elements or pixels. Non-image data 1228 may comprise information from other sensors 1120, such as input from the microphones 1120, weight sensors 1120, and so forth.

User data 1230 may also be stored in the data store 1218. The user data 1230 may include identity data, information indicative of a profile, purchase history, location data, images of the user 1116, demographic data, and so forth. Individual users 1116 or groups of users 1116 may selectively provide user data 1230 for use by the inventory management system 1122. The individual users 1116 or groups of users 1116 may also authorize collection of the user data 1230 during use of the facility 1102 or access to user data 1230 obtained from other systems. For example, the user 1116 may opt-in to collection of the user data 1230 to receive enhanced services while using the facility 1102.

In some implementations, the user data 1230 may include information designating a user 1116 for special handling. For example, the user data 1230 may indicate that a particular user 1116 has been associated with an increased number of errors with respect to output data 1126. The inventory management system 1216 may be configured to use this information to apply additional scrutiny to the events 1124 associated with this user 1116. For example, events 1124 that include an item 1104 having a cost or result above the threshold amount may be provided to the associates for processing regardless of the determined level of confidence in the output data 1126 as generated by the automated system.

The inventory management system 1216 may include one or more of a locating component 1232, identification component 1234, event determination component 1236, and inquiry component 1238.

The locating component 1232 functions to locate items or users within the environment of the facility to allow the inventory management system 1216 to assign certain events to the correct users. That is, the locating component 1232 may assign unique identifiers to users as they enter the facility and, with the users' consent, may locate the position of the users throughout the facility 1102 over the time they remain in the facility 1102. The locating component 1232 may perform this locating using sensor data 1224, such as the image data 1226. For example, the locating component 1232 may receive the image data 1226 and may use facial-recognition techniques to identify users from the images. After identifying a particular user within the facility, the locating component 1232 may then locate the user within the images as the user moves throughout the facility 1102. Further, should the locating component 1232 temporarily "lose" a particular user, the locating component 1232 may again attempt to identify the users within the facility based on user recognition techniques.

Therefore, upon receiving the indication of the time and location of the event in question, the locating component 1232 may query the data store 1218 to determine which one or more users were at or within a threshold distance of the location of the event at the particular time of the event. Further, the locating component 1232 may assign different confidence levels to different users, with the confidence levels indicating how likely it is that each corresponding user is the user that is in fact associated with the event of interest.

The locating component 1232 may access the sensor data 1224 in order to determine this location data of the user and/or items. The location data provides information indicative of a location of an object, such as the item 1104, the user 1116, the tote 1118, and so forth. The location may be absolute with respect to the facility 1102 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 1102, 5.2 m from an inventory location 1114 along a heading of 169°, and so forth. For example, the location data may indicate that the user 1116(1) is 25.2 m along the aisle 1112(1) and standing in front of the inventory location 1114. In comparison, a relative location may indicate that the user 1116(1) is 32 cm from the tote 1118 at a heading of 73° with respect to the tote 1118. The location data may include orientation information, such as which direction the user 1116 is facing. The orientation may be determined by the relative direction the user's 1116 body is facing. In some implementations, the orientation may be relative to the interface device. Continuing the example, the location data may indicate that the user 1116(1) is oriented with a heading of 0°, or looking north. In another example, the location data may indicate that the user 1116 is facing towards the interface device.

The identification component 1234 is configured to identify an object. In one implementation, the identification component 1234 may be configured to identify an item 1104. In another implementation, the identification component 1234 may be configured to identify the user 1116. For example, the identification component 1234 may use facial recognition techniques to process the image data 1226 and determine the identity data of the user 1116 depicted in the images by comparing the characteristics in the image data 1226 with previously stored results. The identification component 1234 may also access data from other sensors 1120, such as from an RFID reader 1120, an RF receiver 1120, fingerprint sensors, and so forth.

The event determination component 1236 is configured to process the sensor data 1224 and generate output data 1126. The event determination component 1236 may access information stored in the data store 1218 including, but not limited to, event description data 1242, confidence levels 1244, or threshold values 1246.

The event description data 1242 comprises information indicative of one or more events 1124. For example, the event description data 1242 may comprise predefined profiles that designate movement of an item 1104 from an inventory location 1114 with the event 1124 of "pick". The event description data 1242 may be manually generated or automatically generated. The event description data 1242 may include data indicative of triggers associated with events occurring in the facility 1102. An event may be determined as occurring upon detection of the trigger. For example, sensor data 1224 such as a change in weight from a weight sensor 1120(6) at an inventory location 1114 may trigger detection of an event of an item 1104 being added or removed from the inventory location 1114. In another example, the trigger may comprise an image of the user 1116 reaching a hand toward the inventory location 1114. In yet another example, the trigger may comprise two or more users 1116 approaching to within a threshold distance of one another.

The event determination component 1236 may process the sensor data 1224 using one or more techniques including, but not limited to, artificial neural networks, classifiers, decision trees, support vector machines, Bayesian networks, and so forth. For example, the event determination component 1236 may use a decision tree to determine occurrence of the "pick" event 1124 based on sensor data 1224. The event determination component 1236 may further use the sensor data 1224 to determine one or more tentative results 1248. The one or more tentative results 1248 comprise data associated with the event 1124. For example, where the event 1124 comprises a disambiguation of users 1116, the tentative results 1248 may comprise a list of possible user identities. In another example, where the event 1124 comprises a disambiguation between items, the tentative results 1248 may comprise a list of possible item identifiers. In some implementations, the tentative result 1248 may indicate the possible action. For example, the action may comprise the user 1116 picking, placing, moving an item 1104, damaging an item 1104, providing gestural input, and so forth.

In some implementations, the tentative results 1248 may be generated by other components. For example, the tentative results 1248 such as one or more possible identities or locations of the user 1116 involved in the event 1124 may be generated by the locating component 1232. In another example, the tentative results 1248 such as possible items 1104 that may have been involved in the event 1124 may be generated by the identification component 1234.

The event-determination component 1236 may be configured to provide a confidence level 1244 associated with the determination of the tentative results 1248. The confidence level 1244 provides indicia as to the expected level of accuracy of the tentative result 1248. For example, a low confidence level 1244 may indicate that the tentative result 1248 has a low probability of corresponding to the actual circumstances of the event 1124. In comparison, a high confidence level 1244 may indicate that the tentative result 1248 has a high probability of corresponding to the actual circumstances of the event 1124.

In some implementations, the tentative results 1248 having confidence levels 1244 that exceed the threshold result 1246 may be deemed to be sufficiently accurate and thus may be used as the output data 1126. For example, the event determination component 1236 may provide tentative results 1248 indicative of the three possible items 1104(1), 1104(2), and 1104(3) corresponding to the "pick" event 1124. The confidence levels 1244 associated with the possible items 1104(1), 1104(2), and 1104(3) may be 25%, 70%, 132%, respectively. Continuing the example, the threshold result 1246 may be set such that confidence level 1244 of 130% are deemed to be sufficiently accurate. As a result, the event determination component 1236 may designate the "pick" event 1124 as involving item 1104(3).

The inquiry component 1238 may be configured to use at least a portion of the sensor data 1224 associated with the event 1124 to generate inquiry data 1250. In some implementations, the inquiry data 1250 may include one or more of the tentative results 1248 or supplemental data 1252. The inquiry component 1238 may be configured to provide inquiry data 1250 to one or more devices associated with one or more human associates.

An associate user interface is presented on the respective devices of associates. The associate may generate response data 1254 by selecting a particular tentative result 1248, entering new information, indicating that they are unable to answer the inquiry, and so forth.

The supplemental data 1252 comprises information associated with the event 1124 or that may be useful in interpreting the sensor data 1224. For example, the supplemental data 1252 may comprise previously stored images of the items 1104. In another example, the supplemental data 1252 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 1226 during presentation to an associate.

The inquiry component 1238 processes the response data 1254 provided by the one or more associates. The processing may include calculating one or more statistical results associated with the response data 1254. For example, statistical results may include a count of the number of times associates selected a particular tentative result 1248, determination of a percentage of the associates that selected a particular tentative result 1248, and so forth.

The inquiry component 1238 is configured to generate the output data 1126 based at least in part on the response data 1254. For example, given that a majority of the associates returned response data 1254 indicating that the item 1104 associated with the "pick" event 1124 is item 1104(5), the output data 1126 may indicate that the item 1104(5) was picked.

The inquiry component 1238 may be configured to selectively distribute inquiries to particular associates. For example, some associates may be better suited to answering particular types of inquiries. Performance data, such as statistical data about the performance of the associates, may be determined by the inquiry component 1238 from the response data 1254 provided by the associates. For example, information indicative of a percentage of different inquiries in which the particular associate selected response data 1254 that disagreed with the majority of associates may be maintained. In some implementations, test or practice inquiry data 1250 having a previously known correct answer may be provided to the associate for training or quality assurance purposes. The determination of the set of associates to use may be based at least in part on the performance data.

By using the inquiry component 1238, the event determination component 1236 may be able to provide high reliability output data 1126 that accurately represents the event 1124. The output data 1126 generated by the inquiry component 1238 from the response data 1254 may also be used to further train the automated systems used by the inventory management system 1216. For example, the sensor data 1224 and the output data 1126, based on response data 1254, may be provided to one or more of the components of the inventory management system 1216 for training in process improvement. Continuing the example, this information may be provided to an artificial neural network, Bayesian network, and so forth, to further train these systems such that the confidence level 1244 and the tentative results 1248 produced in the future for the same or similar input is improved.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computing device comprising:
   a first projector configured to project a visible light ring substantially downwards;
   a second projector configured to project infrared light substantially downwards;
   a camera having a field of view (FOV) that is substantially downwards;

a sensor;

one or more processors; and one or more computer-readable media storing computer-executable instructions that, when executed, cause the one or more processors to perform acts comprising:

causing the first projector to project the visible light ring;

receiving an indication that the sensor has detected an upward-facing palm within the FOV;

determining that the visible light ring is not substantially centered on the upward-facing palm of the user;

causing, at least partly in response to determining that the visible light ring is not substantially centered on the upward-facing palm of the user, the first projector to alter projection of the visible light ring onto the upward-facing palm of the user to visually instruct the user to center the upward-facing palm in the FOV;

causing the second projector to project the infrared light; and causing the camera to generate image data, the image data representing the upward-facing palm with the infrared light projected thereon.

2. The computing device as recited claim 1, wherein the one or more computer-readable media further store computer-executable instructions that, when executed, cause the one or more processors to perform an act comprising sending the image data to a remote computing device for attempting to identify a user account.

3. The computing device as recited claim 1, wherein the one or more computer-readable media further store computer-executable instructions that, when executed, cause the one or more processors to perform acts comprising:

generating feature data using the image data;

analyzing the feature data with respect to each of multiple stored feature data each associated with a respective user account; and identifying a user account.

4. The computing device as recited claim 1, wherein the causing the second projector to project the infrared light comprises causing the second projector to project the infrared light based at least in part on the receiving the indication that the sensor has detected the upward-facing palm within the FOV.

5. The computing device as recited claim 1, wherein:

the causing the first projector to project the visible light ring comprises causing the first projector to project the visible light ring at least partly prior to receiving the indication that the sensor has detected the upward-facing palm within the FOV.

6. A computing device comprising:

a projector configured to project a visible light ring substantially downwards;

a camera having a field of view (FOV) that is substantially downwards;

one or more processors; and one or more computer-readable media storing computer-executable instructions that, when executed, cause the one or more processors to perform acts comprising:

causing the projector to project the visible light ring substantially downwards;

detecting a presence of an upward-facing palm of a user;

determining that the visible light ring is not substantially centered on the upward-facing palm of the user;

causing, at least partly in response to determining that the visible light ring is not substantially centered on the upward-facing palm of the user, the projector to alter projection of the visible light ring onto the upward-facing palm of the user to visually instruct the user to center the upward-facing palm in the FOV; and causing the camera to generate image data representing the upward-facing palm of the user.

7. The computing device as recited in claim 6, further comprising a sensor to detect an object within the FOV, and wherein the detecting the presence comprises detecting the presence of the upward-facing palm at least partly in response to receiving an indication from the sensor.

8. The computing device as recited in claim 6, wherein the camera comprises an infrared camera, and further comprising an RGB camera having an FOV that is substantially downwards.

9. The computing device as recited in claim 6, wherein the projector comprises a first projector and further comprising a second projector configured to project infrared light substantially downwards.

10. The computing device as recited in claim 9, wherein:

the one or more computer-readable media further store computer-executable instructions that, when executed, cause the one or more processors to perform acts comprising causing the second projector to project the infrared light substantially downwards; and wherein the causing the camera to generate the image data comprises causing the camera to generate the image data representing the upward-facing palm of the user while the infrared light is projected thereon.

11. The computing device as recited in claim 9, wherein the one or more computer-readable media further store computer-executable instructions that, when executed, cause the one or more processors to perform an act comprising causing the second projector to project the infrared light substantially downwards at least partly in response to detecting the presence of the upward-facing palm.

12. The computing device as recited in claim 6, wherein the one or more computer-readable media further store computer-executable instructions that, when executed, cause the one or more processors to perform an act comprising sending the image data to a remote computing device for attempting to identify a user account associated with the user.

13. The computing device as recited in claim 6, wherein the one or more computer-readable media further store computer-executable instructions that, when executed, cause the one or more processors to perform acts comprising:

generating feature data using the image data;

analyzing the feature data with respective to each of multiple stored feature data each associated with a respective user account; and identifying a user account associated with the user.

14. A method implemented at least in part by a computing device having a projector configured to project a visible light ring substantially downwards and a camera having a field of view (FOV) that is substantially downwards, the method comprising:

causing the projector to project the visible light ring substantially downwards;

detecting a presence of an upward-facing palm of a user;

determining that the visible light ring is not substantially centered on the upward-facing palm of the user;

causing, at least partly in response to determining that the visible light ring is not substantially centered on the upward-facing palm of the user, the projector to alter projection of the visible light ring onto the upward-facing palm of the user to visually instruct the user to center the upward-facing palm in the FOV; and causing the one or more cameras to generate image data representing the upward-facing palm of the user.

15. The method as recited in claim 14, further comprising receiving, from a sensor of the computing device, an indication that the sensor has detected the upward-facing palm within the FOV.

16. The method as recited in claim 14, further comprising:

outputting an indication that the visible light ring is not substantially centered on the upward-facing palm of the user.

17. The method as recited in claim 16, wherein the outputting the indication comprises at least one of outputting an audible sound or changing a color or pattern of the visible light ring projected by the projector.

18. The method as recited in claim 14, further comprising sending the image data to a remote computing device for attempting to identify a user account associated with the user.

19. The method as recited in claim 14, further comprising:

generating feature data using the image data;

analyzing the feature data with respective to each of multiple stored feature data each associated with a respective user account; and identifying a user account associated with the user.

20. The computing device as recited claim 1, wherein the one or more computer-readable media further store computer-executable instructions that, when executed, cause the one or more processors to perform an act comprising outputting an indication that the visible light ring is not substantially centered on the upward-facing palm of the user, wherein the outputting the indication comprises at least one of outputting an audible sound or changing a color or pattern of the visible light ring projected by the projector.

* * * * *